United States Patent [19]

Westell

[11] Patent Number: 5,028,998
[45] Date of Patent: Jul. 2, 1991

[54] ELECTRONIC ZOOM FOR WIDE-ANGLE LINE SCANNERS

[75] Inventor: William E. Westell, Weston, Mass.

[73] Assignee: Honeywell Regelsysteme GmbH, Offenbach am Main, Fed. Rep. of Germany

[21] Appl. No.: 307,323

[22] Filed: Feb. 6, 1989

[51] Int. Cl.$^5$ .............................................. H04N 3/15
[52] U.S. Cl. .............................. 358/109; 358/213.13; 358/231; 358/241; 358/483
[58] Field of Search .............. 358/109, 213.11, 213.13, 358/225, 231, 241, 483

[56] References Cited

U.S. PATENT DOCUMENTS

| | | | |
|---|---|---|---|
| 3,211,046 | 10/1965 | Kennedy | 350/6.8 |
| 4,467,361 | 8/1984 | Ohno | 358/213.13 |
| 4,554,585 | 11/1985 | Carlson | 358/225 |
| 4,782,228 | 11/1988 | Westell | 350/6.8 |

Primary Examiner—Howard W. Britton
Attorney, Agent, or Firm—Haugen and Nikolai

[57] ABSTRACT

Electronic detector-array synthesis techniques provide fast, precise and accurate digital control of electronic zoom for electro-optical scanning systems. Exponentially-arrayed detector elements with binary-tree size-synthesis and size-interpolation, coupled with logarithmic size-control, offer optimum implementation efficiencies (hardware minimization). Alternative implementations offer different tradeoffs.

66 Claims, 22 Drawing Sheets

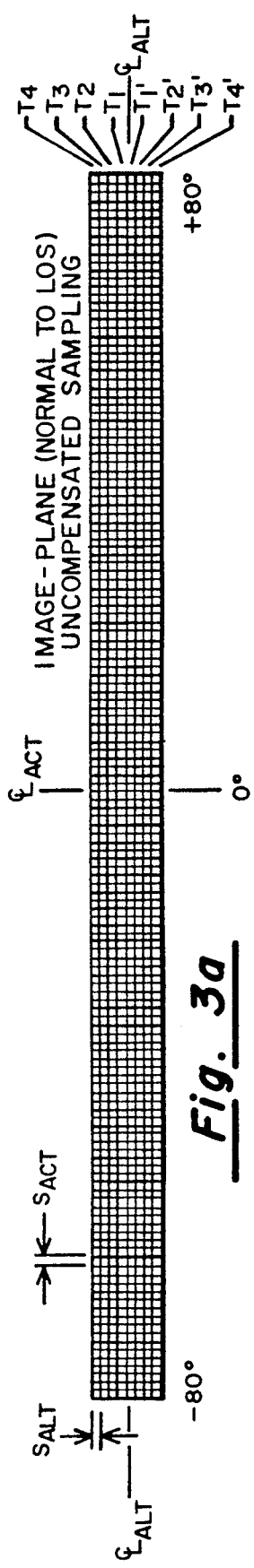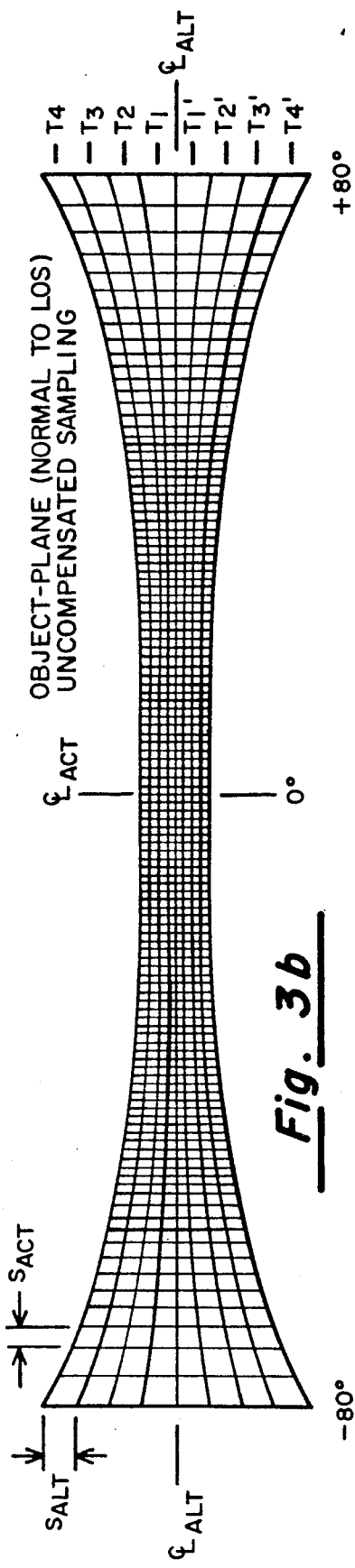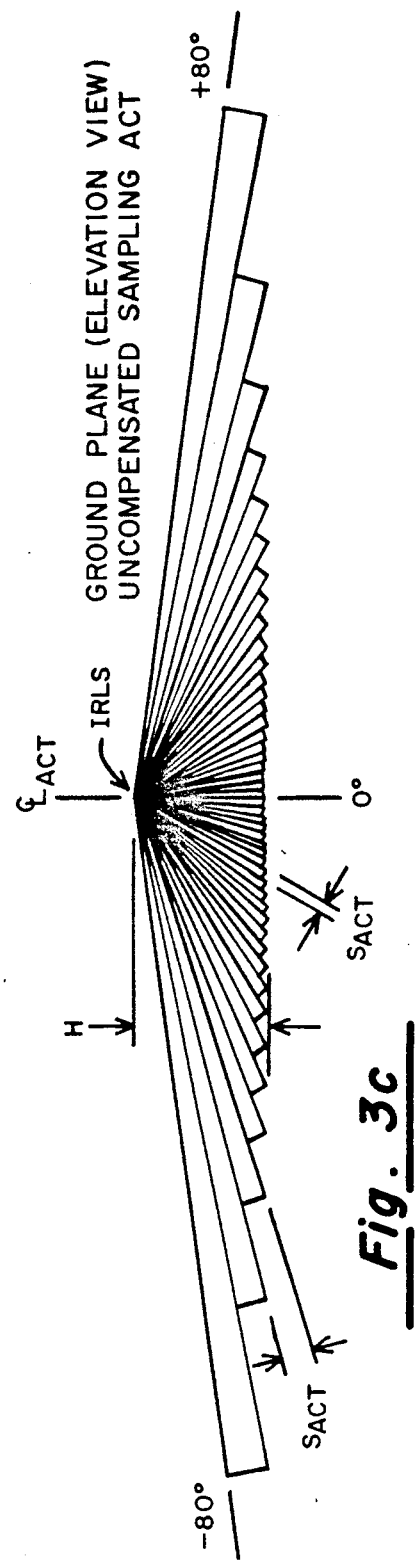

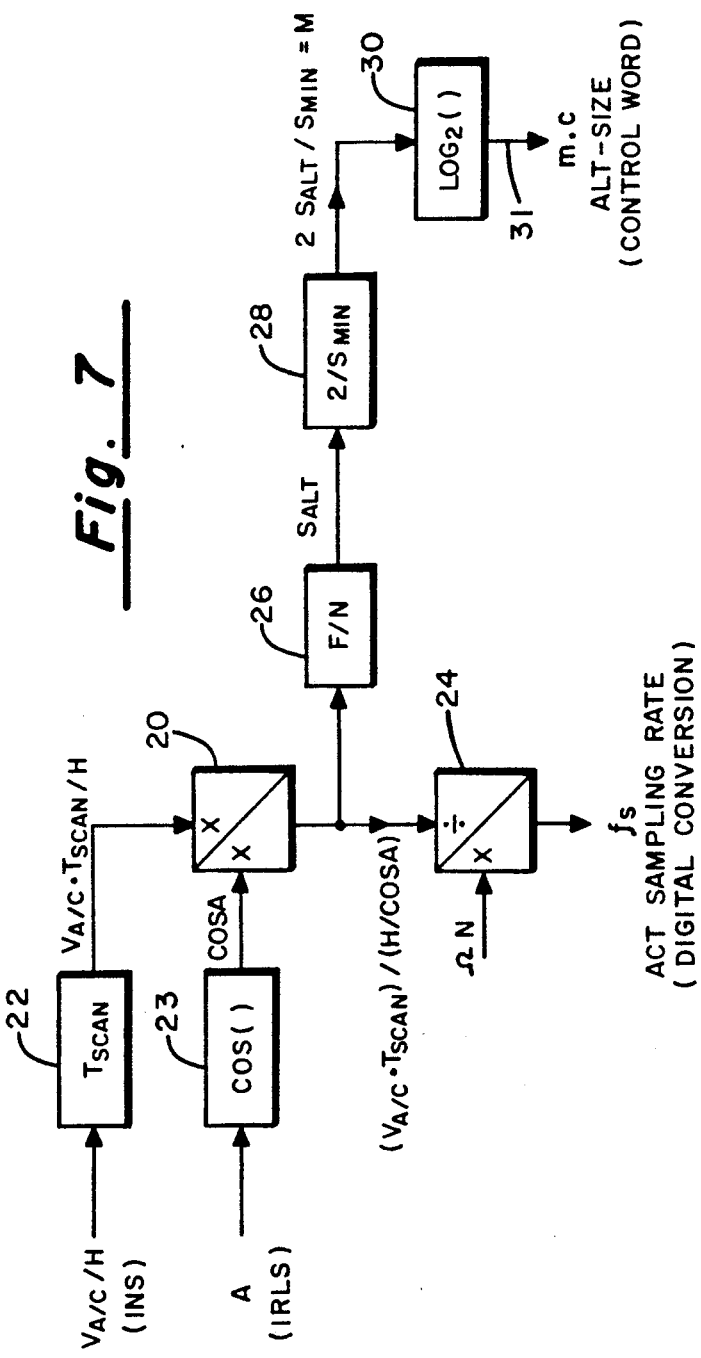
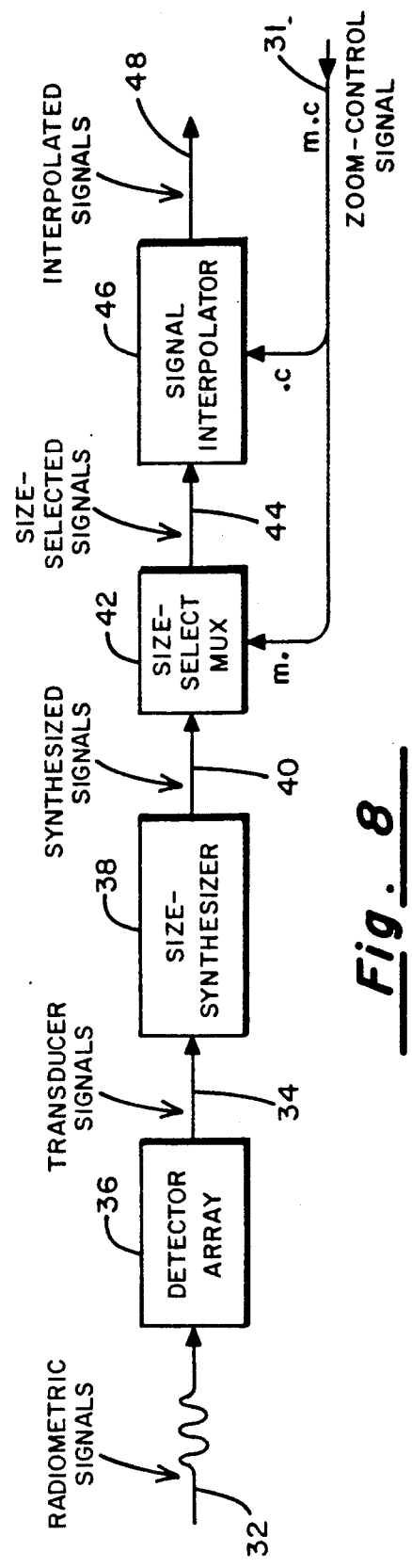
Fig. 7
Fig. 8

DETECTOR ARRAY

ELECTRONIC ZOOM FOR WIDE-ANGLE LINE SCANNERS

BACKGROUND OF THE INVENTION

I. Field of the Invention

This invention relates generally to infrared line scanner (IRLS) systems, forward-looking infrared (FLIR) imaging systems, infrared search/track systems, laser printers and other electro-optical systems employing detector-array and/or emitter-array scanning with the requirement for fast, precise and accurate control of resolution and/or field coverage with electronic zoom.

II. Discussion of the Prior Art

Referring to FIG. 1, infrared line scanners (IRLSs) installed in reconnaissance aircraft typically use a linear detector array, i.e. a detector array consisting of a line of uniformly-spaced, equal-sized detector elements. The linear array is scanned over a constant-width swath on the ground at a constant angular rate in a plane normal to the aircraft (A/C) flight-track line. The direction of this flight-track line is commonly referred to as "along track" (ALT), while the scan direction is called "across track" (ACT). Opto-mechanical ACT scanning typically is provided by a Kennedy-type scanner (U.S. Pat. No. 3,211,046, Oct. 12, 1965). The detector elements of the linear array are individually connected one-to-one to a corresponding number of recording channels, either for electronic recording (as in FIG. 2) or for film recording (as in FIG. 5).

Since the A/C velocity ($V_{A/C}$) provides the IRLS scanning motion of the array in the ALT direction on the ground and recording is done in a rectilinear format (X-Y Cartesian coordinate system) with a fixed number of recording channels during a given ACT scan, a constant-width swath of ground imagery must be recorded during each scan for contiguous imagery recording in which successive scans are properly spliced together along the entire length of each scan. The width of the swath recorded during each scan period ($T_{scan}$) must equal the product: $V_{A/C} \cdot T_{scan}$, which is the ALT distance advanced by the A/C in each scan period. Furthermore, since the number of recording channels and the recorded swath-width must be constant during a given scan, the recorded imagery must have a constant ALT ground scale and "resolution" during a given scan. Further, the ACT scale must be maintained equal to the ALT scale to maintain aspect ratios of the ground imagery. These requirements have been satisfied in prior art IRLS systems by restricting operation to higher altitudes and limiting scan angles to approximately 30 degrees from nadir.

Maintaining the recorded swath-width precisely equal to the distance advanced per scan is a fundamental IRLS requirement if contiguous imagery in successive scans is to be attained. This requirement has previously been met by different combinations of techniques, such as varying the optical scan rate, varying the number of channels recorded, varying the film speed used with a CRT film writer/recorder and switching to additional detector arrays of differing sizes to compensate for A/C altitude and velocity variations. The present invention avoids the inevitable disadvantages in cost, complexity and performance limitations associated with these known techniques while providing continuously-optimized performance.

Even with this complexity of controls, known prior art IRLS systems must operate within a very limited scan angle for a substantially constant range during a given scan, to prevent "bow tie" image distortions (shown in FIG. 3B) due to a fixed array image being swept out over the ground with ever-larger "foot prints" as range, R, increases with wide-angle scanning. The "bow tie" distortion is occasioned by the failure to maintain the recorded swath-width constant, equal to the distance advanced by the aircraft per scan. Thus, it is evident that prior art IRLS systems are inherently incapable of providing wide-angle operation without serious image distortions.

However, a real need exists for a very wide-angle IRLS scanning capability. For example, very wide-angle coverage is a fundamental requirement for adequate ground coverage in tactical reconnaissance missions in which survival necessitates the extremely low-altitude A/C operation now permitted by automatic terrain-following A/C flight control.

Prior art IRLS design must be improved with some form of extremely fast optical zoom or magnification control to meet these new requirements for very wide-angle operation. The zoom or magnification must be continuously and precisely controlled to be proportional to range during the ACT scanning motion, with range varying typically by a factor of at least one hundred to one. Instantaneous range must be computed from A/C altitude above ground level (AGL): H and scan angle from nadir: A. With scanning rates in the order of hundreds of scans per second and with requirements for fast (f/1), high-resolution diffraction-limited optics, use of any known opto-mechanical zoom design is obviously not feasible.

Optical scanning systems which compensate for range variation with scan angle only in the ALT axis are described in applicant's earlier U.S. Pat. No. 4,782,228, assigned to the assignee of the present invention. These systems provide anamorphic zoom, viz., in the ALT direction only. They must be used with prior techniques to compensate for A/C altitude and velocity variations, and must be used with the ACT electronic-zoom technique of the present invention to avoid serious aspect-ratio distortions.

OBJECTS OF THE INVENTION

The fundamental object of the present invention is to maximize the image-information capacity of IRLS systems by providing a two-dimensional image-mapping function that maps a constant-ALT-width swath of ground imagery onto a constant-width recorder/display rectilinear format, and that maps imagery ACT with the same scale as ALT in order to preserve aspect ratios of the imagery in object space; such that, imagery so-mapped and displayed to the eye, would have the same local spatial relations as if viewed directly from the aircraft with an infrared-sensitive eye. This fundamental object is accomplished by providing electronic zoom which continuously maintains constant ALT and ACT spatial sampling rates on the terrain normal to the line-of-sight (LOS) during the IRLS system scans of the terrain.

It is the another object of the present invention to provide a very fast electronic electro-optical equivalent of the optical-zoom or magnification control required to provide contiguous imagery in successive scans with very wide-angle IRLS operation.

It is the further object of this invention to provide imagery with constant ground scale to avoid the imagery-mapping distortions inherent with variations in ground scale due to range variations during continuous recording.

SUMMARY OF THE INVENTION

The present invention teaches the principle of detector-array synthesis and sampling-control with a virtually-continuous zoom/scale-control capability. Complexity and cost are minimized by use of non-linear detector arrays, i.e. arrays in which a line of detector elements are non-uniformly spaced, and generally, but not necessarily, have a size equal to their spacing. The non-linear arrays are sampled with an electronic multiplexer system to provide the required mapping. The multiplexers are controlled by digital-control techniques which provide a practically unlimited range of precise, reliable zoom/scale control.

The basic principle behind the synthesis technique of the present invention is that, since detector arrays constitute a radiometric-imagery sampled-data system, samples can be averaged and interpolated (within the well-known limits of sampled-data systems) to synthesize a new array of samples equal to those which would be generated by a detector array of the desired size.

In the IRLS application, a fixed number of synthesized detector signals are generated, equal to the fixed number of recording channels determined by resolution requirements. In summary, the ALT and ACT sampling rates are ideally equal and directly proportional to instantaneous range during the IRLS scan.

The preferred synthesis embodiments take advantage of very-high-speed electronic analog-signal multiplexing techniques for analog-signal selection and addition, and voltage-divider or time-division multiplication techniques for analog-signal interpolation, which can accommodate the video bandwidths encountered in current systems. However, digital processing techniques will be well-suited to the synthesis requirements when their signal-processing throughput and cost-effectiveness adequately improves.

There are two preferred ALT detector-array synthesis techniques, which are capable of maintaining the ALT sampling rate directly proportional to the instantaneous range to the ground image being scanned.

The first ALT preferred synthesis technique involves the use of two-stage ALT scaling. First, detector signals are added to synthesize several binary-sized groups of N equivalent detectors (for N recording channels), with groups sequentially selected by multiplexers controlled by the most-significant bits (MSBs) of the array size-control word. Then, the selected group of signals are interpolated by a voltage-divider network (or by various forms of a time-division multiplexer) over a size variation of a factor of two, controlled by the least-significant-bits (LSBs) of the size-control word. The operation is analogous to the MSBs and LSBs of a digital-to-analog converter (DAC) which interleave to produce a virtually continuous linear conversion.

The second ALT preferred synthesis technique generates N equivalent-detector signals directly in a single stage of time-division multiplexing which simultaneously selects and interpolates detector signals to produce a set of signals equivalent to the synthesized array.

After the larger number of detector signals is reduced to N (the number of recording channels) by the ALT-scaling analog-signal multiplexing, ACT scaling is provided by sampling and digital conversion and temporary storage of the N signals at a rate directly proportional to instantaneous range. The N synthesized detector signals are stored digitally and converted back to analog signals at a constant rate for display (and for high-density recording on film or on magnetic tape) with constant, and ideally equal, scale in both the ALT and ACT directions. In this fashion, the ACT electronic temporal-sampling rate combined with the ACT optical spatial-scan rate produce an equivalent ACT spatial-sampling rate equal to, or directly proportional to, the required instantaneous spatial-sampling rate of the synthesized ALT detector array.

Further teachings of the present invention are with regard to practical implementation efficiencies which can be achieved by use of:

1. Exponential scaling of detector arrays, with the most efficient being binary (exponential base 2);

2. Simplified size-select multiplexer control with logarithmic scaling of the digital size-control word;

3. Size interpolation with logarithmic scaling, which minimizes size-control word LSB-quantization errors due to all LSBs being a constant (minimum) percentage;

4. Binary-tree, size-synthesis topology which minimizes hardware and reduces electronic cross-talk which is an inherent multiplexer problem at video-signal rates;

5. Synthesis of a large number of arrays from a single array, rather than the inefficient use of a number of separate, redundant arrays as in prior art;

6. Resolution-controlled digital conversion, which minimizes the digital storage capacity required to meet a specified reconnaissance-imagery information content; and 7. Electronic multiplexing techniques with wide-dynamic-range digital control for two-dimensional sampling and interpolation scaling.

The foregoing objects and advantages of the invention will become apparent to those skilled in the art from the following detailed description of a preferred embodiment when taken in conjunction with the accompanying drawings in which like numerals in the several views refer to corresponding parts.

BRIEF DESCRIPTION OF THE DRAWINGS

FIG. 3A illustrates graphically the image-plane, normal to the line-of-sight (LOS), uncompensated sampling;

FIG. 3B illustrates graphically the object-plane, normal to the LOS, uncompensated sampling;

FIG. 3C shows an elevation view of the ground-plane, uncompensated sampling;

FIG. 7 is a computational flow diagram illustrating digital-signal generation for ALT and ACT IRLS zoom control;

FIG. 8 is a functional block diagram of the two-stage ALT-signal processing functions of a specific embodiment of the present invention, in which detector elements are arrayed exponentially discretely in groups of two equal-sized elements per octave;

DETAILED DESCRIPTION OF THE PREFERRED EMBODIMENTS

Figure 1:
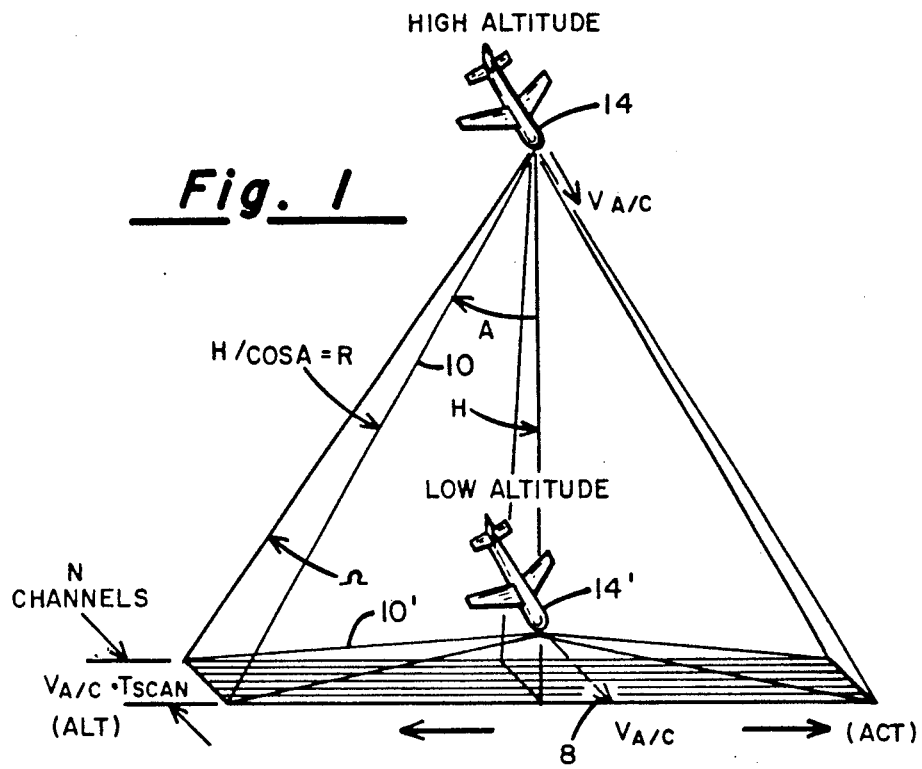
FIG. 1 illustrates the IRLS scanning geometry allowing contiguous imagery by properly splicing successive scans of detector arrays over the ground.

Referring again to FIG. 1, the general geometrical, definitional and relational aspects of the invention will be described. The IRLS records N channels of infrared (IR) imagery from a constant-width ground-swath during each scan. The width of this swath is equal to the forward distance advanced by the IRLS during each scan period referred to as "T scan". With an aircraft (A/C) 14 or 14' having a velocity vector 8 labeled: $V_{A/C}$, this swath-width equals $V_{A/C} T_{scan}$. The ground-imagery interval equals this swath-width divided by N where N is the number of channels recorded. This interval is often called "ground resolution" because the number of recording channels equals the number of detector channels uniformly distributed over the image of this swath in the focal plane of the IRLS. Subsequent scans record contiguous ground swaths, each consisting of N detector channels and N recorder channels.

During each scan, the range: R identified by lines 10 and 10' for high and low flying A/C respectively, is equal to H/COS(A), where H is the A/C altitude, AGL, the true height above ground level during each scan, and A is the scan angle from nadir. The optical scan rate $\Omega$ is measured in radians per second.

Figure 2:
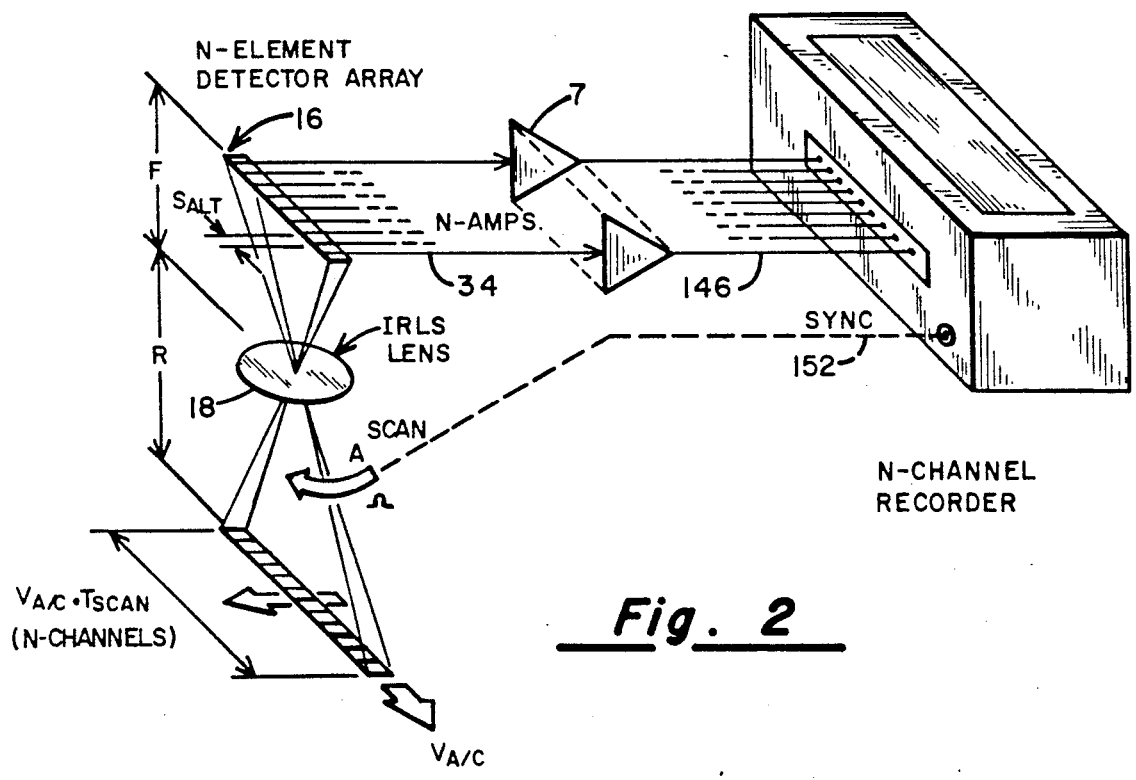
FIG. 2 illustrates diagrammatically the IRLS principle of recording N channels of IR data with an N-channel magnetic-tape recorder.
Figure 5:
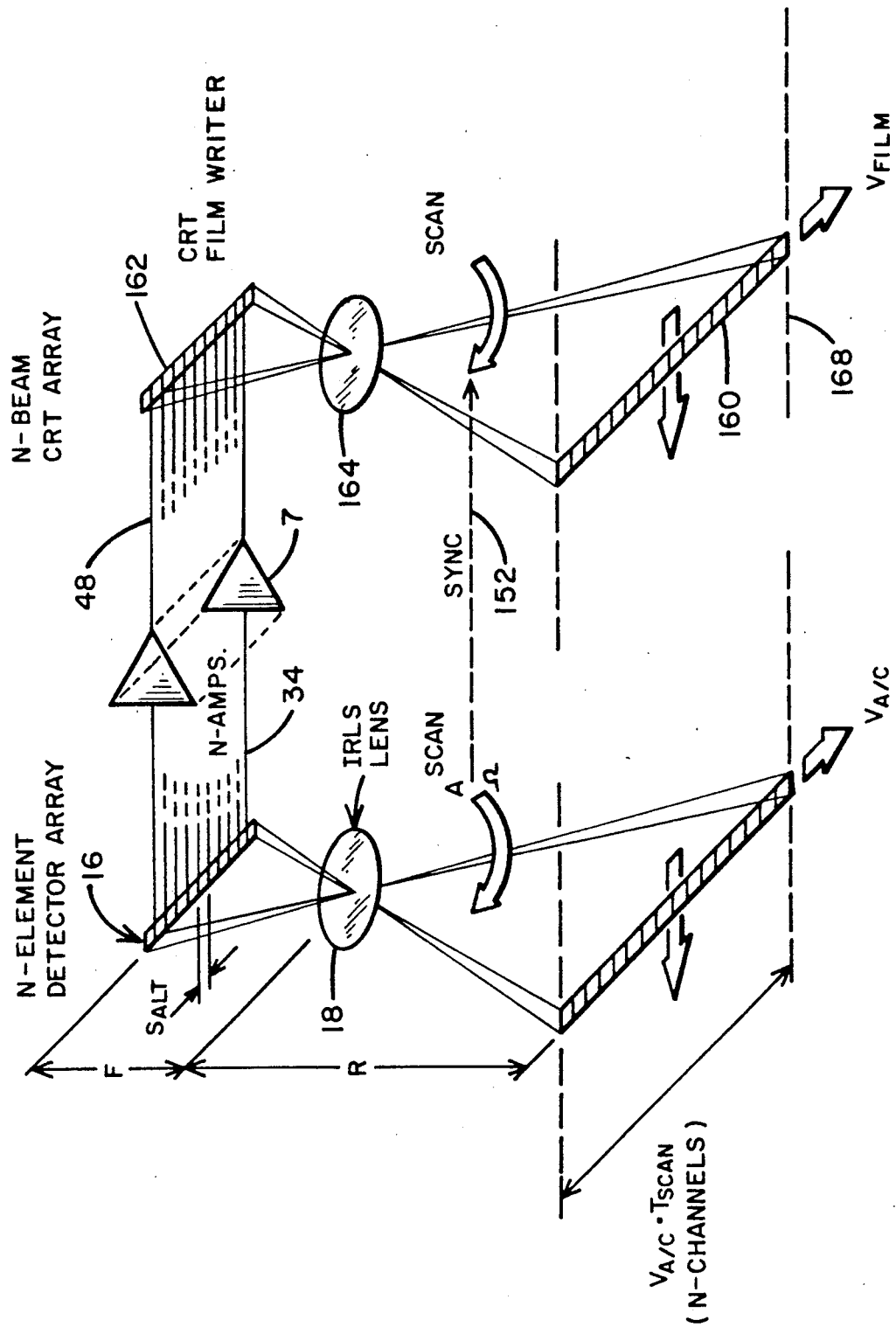
FIG. 5 illustrates diagrammatically the IRLS principle of recording N channels of IR data with an N-beam cathode-ray-tube (CRT) film writer.

FIGS. 2 and 5 illustrate diagrammatically the IRLS principles of recording N channels of IR data on magnetic tape and on film. Synchronism for recording control on line 152 is provided by scan angle, A, and scan rate $\Omega$. The IRLS lens 18 images object-space scan-swath indicated by double arrow 15 at a range, R, onto the N-element linear detector array 16, with a focal length, F. In FIG. 5, electron lens 164 of CRT film writer recorder scans the image 160 of N-beam array 162 over film 168 synchronously with the scan of IRLS lens 18. Film 168 is moved synchronously with the $V_{A/C}/H$ of ground image in prior art systems and at constant speed in the present invention. In FIG. 2, in a manner analogous to the film recording of FIG. 5, electronic-data manipulation stores the IR data on magnetic tape for subsequent retrieval and display, typically on a TV monitor using a TV formatter. Both of these technologies are well known and need not be described herein with further detail. They are simply provided to establish the context of the present invention in which signal-processing mapping electronics, to be described, are added between amplifiers 7 and the IR data recording means of FIGS. 2 and 5 which, along with a uniquely-configured detector arrays, constitute one novel aspect of the present invention.

Figure 6:
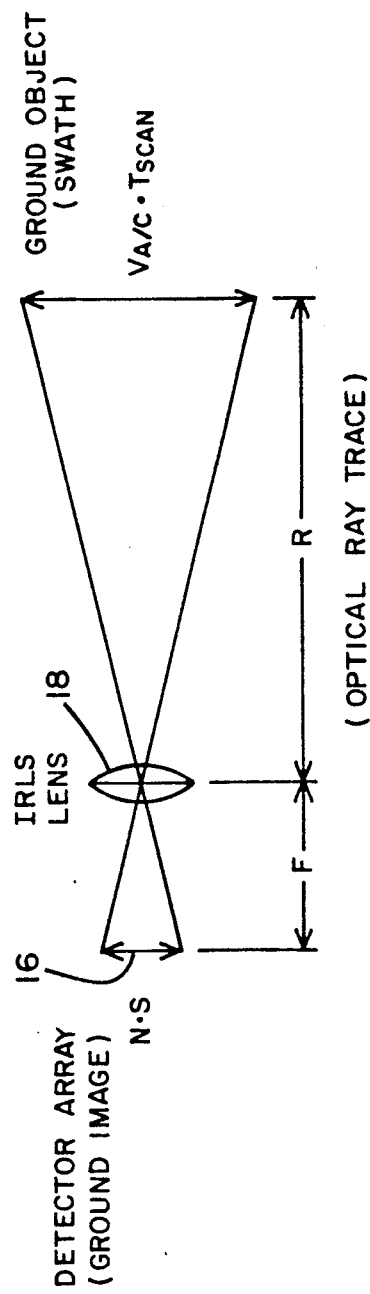
FIG. 6 is an optical ray-trace diagram useful in deriving the geometrical relations necessary to satisfy the fundamental IRLS requirement in accordance with the teachings of the present invention.

Referring now to the equivalent optical schematic of the IRLS shown in FIG. 6, the ALT ground-swath-width: $V_{A/C}T_{scan}$, is imaged on the IRLS focal plane 16 by the IRLS lens 18 having a focal length, F. The swath-width in the image plane 16 is equal to the product: $V_{A/C}T_{scan}$ times the IRLS optical magnification ratio F/R due to imaging with a focal length F at a range R. Thus, with N detector/recorder channels (FIGS. 2 and 5), the sampling interval, $S_{alt}$, in the image plane 16 equals this swath-width image in the focal plane divided by N:

$$S_{alt} = (V_{A/C}T_{scan}F/R)/N = (V_{A/C}/H) \cos(A) T_{scan}F/N \quad (1)$$

The spatial frequency at which these sampling intervals occur is commonly called the spatial sampling rate. The theoretical maximum limit of image frequencies which can be sampled and reconstructed without imagery "aliasing", introduction of artifacts, is called the Nyquist limit, which is exactly one-half this spatial sampling rate.

The equivalent temporal sampling interval: $t_s$ in the ACT scan direction, corresponding to the spatial sampling interval $S_{alt}$ in the ALT direction, is given by equating ACT angular sampling intervals:

$$\Omega t_s = S_{alt}/F \quad (2)$$

Since the ACT temporal sampling frequency $f_s = 1/t_s$, the temporal sampling frequency, $f_s$, required for equal sampling intervals ALT and ACT is:

$$f_s = \Omega F/S_{alt} \quad (3)$$

This is the temporal sampling frequency required to avoid anamorphic imaging distortion in which the ACT scale (image magnification) differs from the ALT scale of equation (1). It will be understood by those skilled in the art that practical anti-aliasing filters will require somewhat higher sampling frequencies in analog-to-digital conversions which will be compensated by proportionally higher rates of digital-to-analog conversion for display, to maintain the desired imagery aspect ratio without anamorphic distortion.

Thus, it is seen that ALT and ACT sampling frequencies and intervals must be dynamically controlled as a function of $V_{A/C}$, altitude, H, and the scan angle, A, as well as the fixed parameters of the IRLS.

The aforementioned distortions are shown graphically in FIGS. 3A through 3C which illustrate the ground-swath of an uncompensated IRLS scanner with a fixed, linear detector array swept through an angle of $-80°$ to $+80°$, which is significantly less than typically-required coverages of $-89.5°$ to $89.5°$, for clarity of exposition. FIG. 3A shows image-plane normal to LOS uncompensated sampling; FIG. 3B shows object-plane, normal to the LOS, uncompensated sampling; FIG. 3C shows an elevation view of the ground-plane uncompensated sampling. It is essential to the complete understanding of the present invention to observe that image magnification and scale are always referred to image planes, containing a detector array, and object planes, containing a ground-image plane, which are normal, i.e., perpendicular to, the instantaneous LOS determined by the scan angle A, as explicitly shown in FIGS. 3C and 4C. This shows the bow-tie distortion pattern that results from a constant sampling frequency and a constant magnification due to a fixed array, as is common in conventional IRLS systems, in which the overlap of successive scans at higher scan angles results in loss of image-information content. In this example, each swath is comprised of N=8 recording channels indicated as T1-T4 and T'1-T'4 on either side of the ALT centerline. For each channel, radiometric data is shown being sensed over a one-degree arc segment, integrated and converted to a digital value. Thus, each square corresponds to a one-degree digital sample at one instant in time in one channel. This sample is commonly referred to as a pixel (picture element).

In practical systems, it is understood that the number of channels and especially the number of samples per channel would generally be substantially larger than this. However, these small numbers have been chosen for clarity in teaching the principles of the invention. The conventions in identifying channels in FIGS. 3A through 3C will be carried through in subsequent figures and discussions throughout the remainder of the specification. Specifically, unprimed channels lie above the ALT centerline whereas channels with a prime superscript have the mirror image position below the ALT centerline. The subscripts 1-4 indicate the position of the channel relative to the ALT centerline. The vertical spacing of each sample represents the ALT sample spacing on the ground object plane, while the horizontal spacing of each sample represents the ACT sample size also on the ground object plane which is always normal to the line-of-sight (LOS).

Notice that at small angles from nadir, constant ALT and ACT ground coverage is maintained. However, at larger angles significant distortions occur because imagery samples are not taken from constant ground intervals, but from constantly expanding intervals which cause overlapping of successive scans that destroys the information value of the imagery.

Figure 4A:
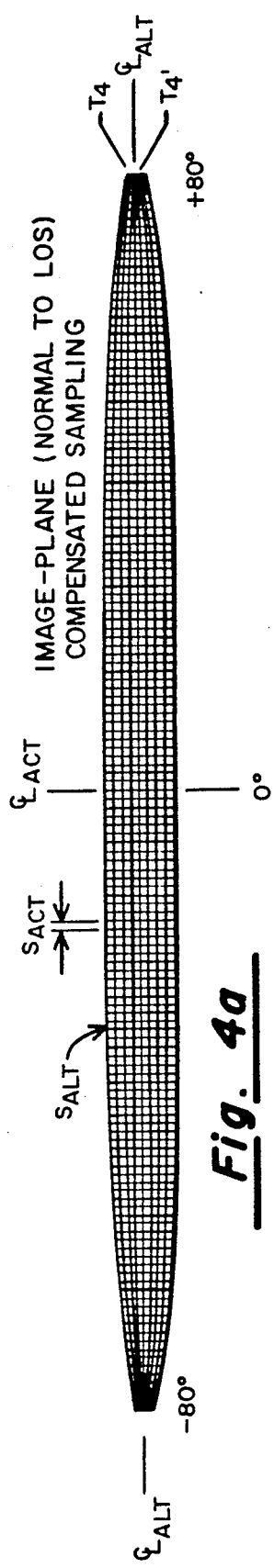
FIG. 4A illustrates graphically the image-plane, normal to the LOS, compensated sampling.
Figure 4B:
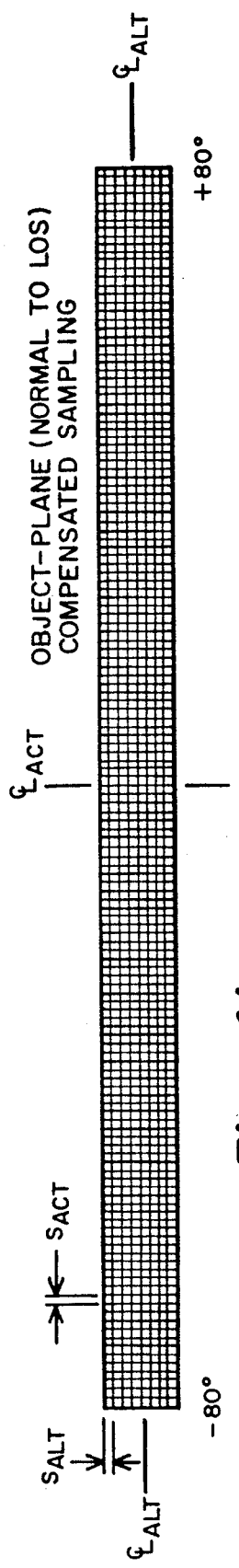
FIG. 4B illustrates the object-plane, normal to the LOS, compensated sampling.
Figure 4C:
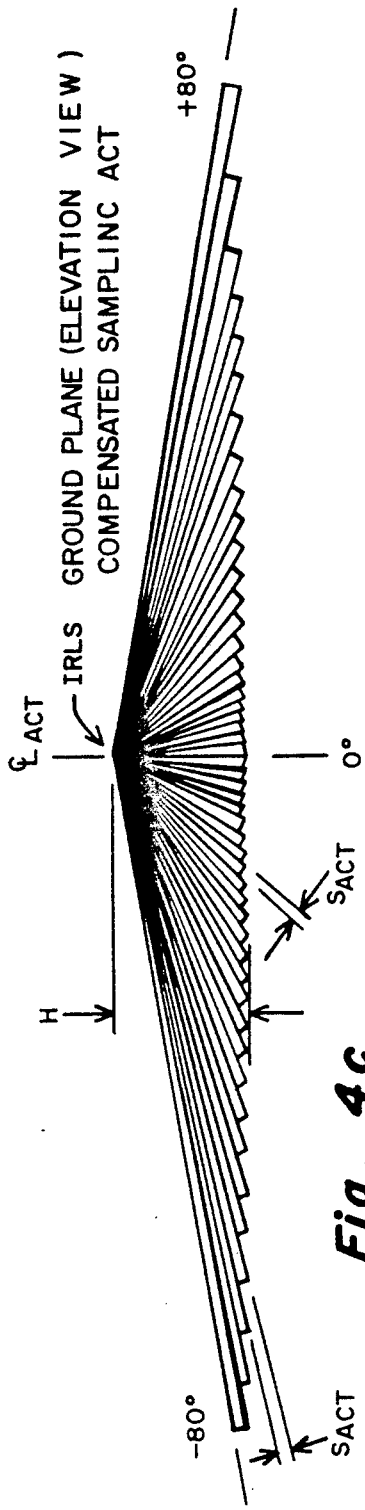
FIG. 4C is an elevation view of the ground-plane, compensated sampling, across-track (ACT)
Figure 4D:
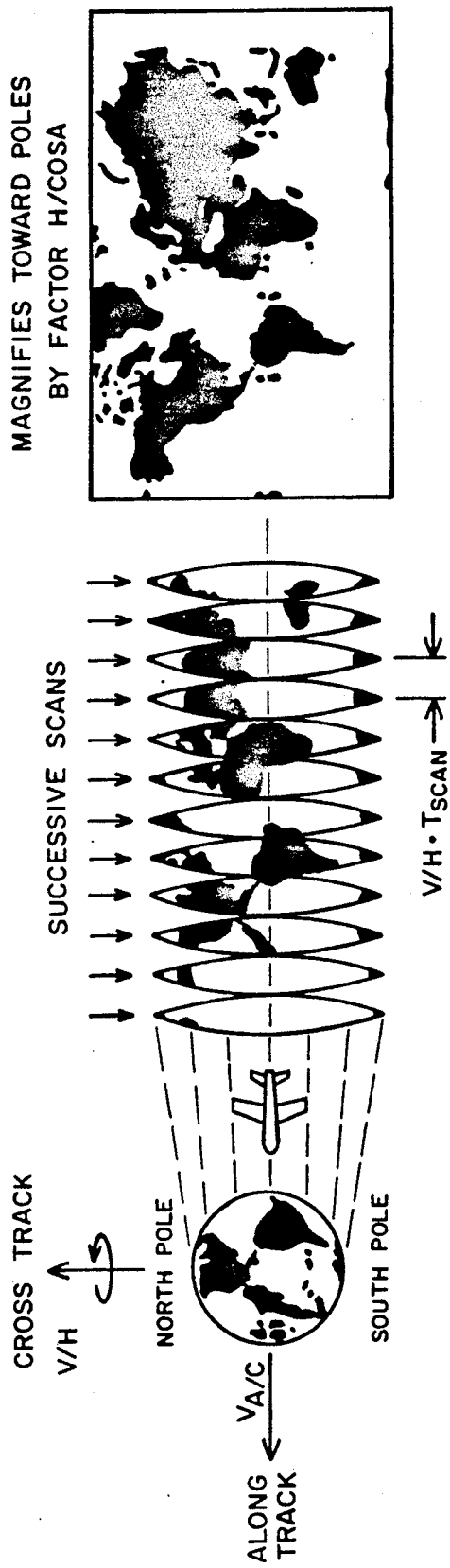
FIG. 4D shows the mapping resulting from the required compensated sampling, which has a spatial rate proportional to H/COS (A), resulting in mapping mathematically identical to the Mercator projection.

FIGS. 4A through 4C show the desired results: all samples for the entire swath from $-80°$ to $+80°$ are of uniform size on the ground-object plane, normal to LOS. This is accomplished by continuously, sample-by-sample, controlling both the ALT and ACT sample rate and thus the ALT and ACT magnification throughout the scan. FIG. 4A shows image-plane compensated sampling in which sampling frequency is directly proportional to range: $R = H/\cos A$, with A from $-80°$ to $+80°$. FIG. 4B shows the desired result of compensated sampling which maintains $S_{ALT}$ and $S_{ACT}$ constant in the object-plane normal to the LOS. FIG. 4C shows the elevation view of the ground-plane compensated sampling. Note that the constant sampling interval required is in the object-plane normal to the LOS, not in the horizontal plane, which would require a sampling frequency proportional to $H/\cos^2 A$ and would cause anamorphic aspect-ratio distortion. FIG. 4D shows the mapping, that results from the required sampling proportional to $H/\cos A$, is mathematically identical to the Mercator projection, in which successive scans are represented as 15° ALT gores between North-South poles (corresponding to $-90°$, $+90°$ horizon points).

This mapping inherently preserves aspect ratios out to the poles, which is a basic objective of the present invention.

In practical systems, scan periods are in the order of a few milliseconds. For the example of FIGS. 4A through 4C, the required magnification change would be a factor of 5.76, while for actual systems, would be 100 or greater. Since physical optical elements cannot be accurately and reliably servo-positioned at these rates for optical zoom control, an electronic zoom is required.

The IRLS size-control requirement for zoom has been shown by means of FIG. 6 which uses conventional optical ray tracing to relate the size of the ground object swath-width, equal to $V_{A/C}T_{scan}$, to the size of the image of this swath-width. The required sampling interval $S_{alt}$, given by equation (1) equals the required detector spacing: S. The problem to be solved is to maintain a uniform swath as range: R varies, but without varying the focal length: F, i.e, without resorting to zoom optics with movable elements. Since recording formats are rectilinear, the value N must remain constant during any given scan. Thus, the only variable which is free to change is the detector sampling interval, S.

What follows is a description of a novel electronic system which uses a single detector array of non-uniformly spaced elements combined with synthesis circuitry to produce a virtual or synthesized array in which S: the sampling interval in the image plane, is precisely and virtually continuously variable over the large dynamic range required for wide angle scanning. The effect of this is that, as the range: R changes during the scan process and the angular subtense of the ground image corresponding to a uniform swath changes inversely with range R, the sampling interval: S, also changes inversely proportionally to R, such that the S remains proportional to the angular size of the ground image 16, which varies inversely with R. The result is the same as if a fixed-size detector array had been used and the focal length, F, had been varied directly with range, R, by means of movable optical elements. Thus, the novel electronic zoom provides a capability for a very fast zoom control, equivalent to a conventional optical zoom produced with movable optical elements driven by an electro-mechanical servo, but several orders of magnitude faster.

Electronic zoom control requires that ALT sampling intervals $S_{alt}$ and ACT sampling frequencies: $f_s$ must be dynamically controlled by $V_{A/C}$, H and COS(A), as well as by the fixed parameters of the IRLS, as given by equation (1). Since practical IRLS scan rates are in the order of several thousand revolutions per minute (RPM), electronic control b $V_{A/C}$, H and COS(A) is required up to several megahertz (MHz). The sampling interval $S_{alt}$ and sampling frequency $f_s$ computations, for electronic zoom control with the required speed, accuracy, resolution and dynamic range, can be performed using well-known digital techniques as represented by the block diagram of FIG. 7 wherein $V_{A/C}$/H is supplied by the aircraft inertial navigation system (INS) and angle A from the IRLS with A/C roll correction from the INS.

This establishes the exact requirements for electronic zoom in the IRLS application. The corresponding electronic zoom requirements for other applications also can be readily derived. The present patent teaches the principles and techniques for digital control of $S_{alt}$ (ALT sampling interval) and $f_s$ (ACT sampling frequency) for high-precision electronic zoom control in scanning systems in general, and in the IRLS type of scanning system in particular. It further teaches, in particular, the principles of binary (base 2) encoding for maximum efficiencies of detector-array synthesis and compatibility with digital control systems which are predominantly binary (base 2).

Referring again to FIG. 7, the computation and generation of the digital control signals $S_{alt}$ and $f_s$ are specified. Transform functions COS ( ), box 23, and $LOG_2$ ( ) box 30, are look-up tables stored in read-only-memory (ROM). The transform function COS ( ) is applicable only to a perfectly flat ground terrain, which is rarely the case. This function is used herein to simplify the illustration of the range computation. In actual practice, this would be a more flexible set of curve-fitting functions stored in electronically-selected ROMs under the control of the A/C inertial guidance/navigation computer, which has access to a digital map of the terrain being overflown. The curve-fitting parameters of the digital terrain profiles ACT are computed and used to select and control these curve-fitting functions, such that actual range to the terrain being overflown is provided to the computation process being described. In particular, the COS ( ) function of box 23 is replaced by an off-line computational-procedure in the A/C main computer (MC) which takes A/C altitude above-ground-level (AGL): H from the INS and terrain heights from the digital map addressed by A/C position obtained from the INS, and computes ranges as a function of scan angle A for curve fitting to this range function, which enables a fast lookup of range from ROMs as a function of the scan-angle A input to box 23. The application of these techniques are all well known within the current state-of-the-art in digital-electronics engineering in contemporary avionics and thus need not be described here in any further detail.

The quotient, $V_{A/C}$/H ("V over H"), provided by the A/C inertial-navigation system (INS), is multiplied by the IRLS constant $T_{scan}$ (box 22) and also (box 20) by the COS(A) (or equivalent selected curve-fitting ROM) to form the product: $(V_{A/c}T_{scan})/(H/COS(A))$ which is divided into the constant product of $\Omega N$ using divider 24 to generate the ACT sampling rate, $f_s$, and is multiplied by the constant product F/N at block 26 to generate the scanning interval, $S_{alt}$. The $S_{alt}$ factor on line 27 is subsequently multiplied by the constant $2/S_{min}$ at block 28, where $S_{min}$ is the size of the minimum scanning interval of real or synthesized detectors, and the logarithm to the base 2 is taken at block 30 to compute the digital binary ALT-size-control word "m.c" on line 31 where "m." is the mantissa (integer part) and ".c" is the characteristic (fractional part) of the $LOG_2$ ($S_{alt}$/($S_{min}$/2)). Thus, m. is the integer power of 2 of $S_{alt}$/($S_{min}$/2) and ".c" is the fractional part of that quantity. This control-word format, "m.c", on line 31 is the basis of the digital control technique of the preferred embodiment, as will become apparent from a continued reading.

Outputs ACT sampling frequency $f_s$, and ALT-Size-Control word: "m.c" (FIG. 7) are continuously computed in real time to produce the results shown in FIGS. 4A through 4C.

The primary principles and techniques for digital control of $S_{alt}$ (ALT sampling interval) using ALT-Size-Control word: "m.c" are first considered by reference to FIG. 8 which shows an operational block diagram for ALT scaling of $S_{alt}$. Here, radiometric signals incident on detector array elements 36 (line 32) are transduced to electronic analog signals on line 34 by detector array elements 36. The transducer signals are then proportionally added together by a size-synthesizer 38 to create groups of equal-size detector signals on line 40 which are then selected by the size-select multiplexer 42 to obtain size-selected signals on line 44 for interpolation by the signal interpolator module 46. The interpolated signals on line 48 provide for a relatively fine control of $S_{alt}$ by a second type of proportional signal addition for interpolation.

FIG. 8 shows a two-stage synthesis which makes use of the efficiencies of a binary (base 2) organization in which the size synthesizer 38 and size select mux 42 synthesize sizes which are related by integer powers of two. Then, the signal interpolator 46 interpolates these sizes over a range of a factor of two. The coordinated digital control by the size select mux 42 and the signal interpolator 46 provides practically unlimited dynamic range and resolution of ALT zoom or magnification. Obviously, bases other than two and other procedures for proportional additions of signals could be used without deviating from the teachings of the present invention.

Figure 9:
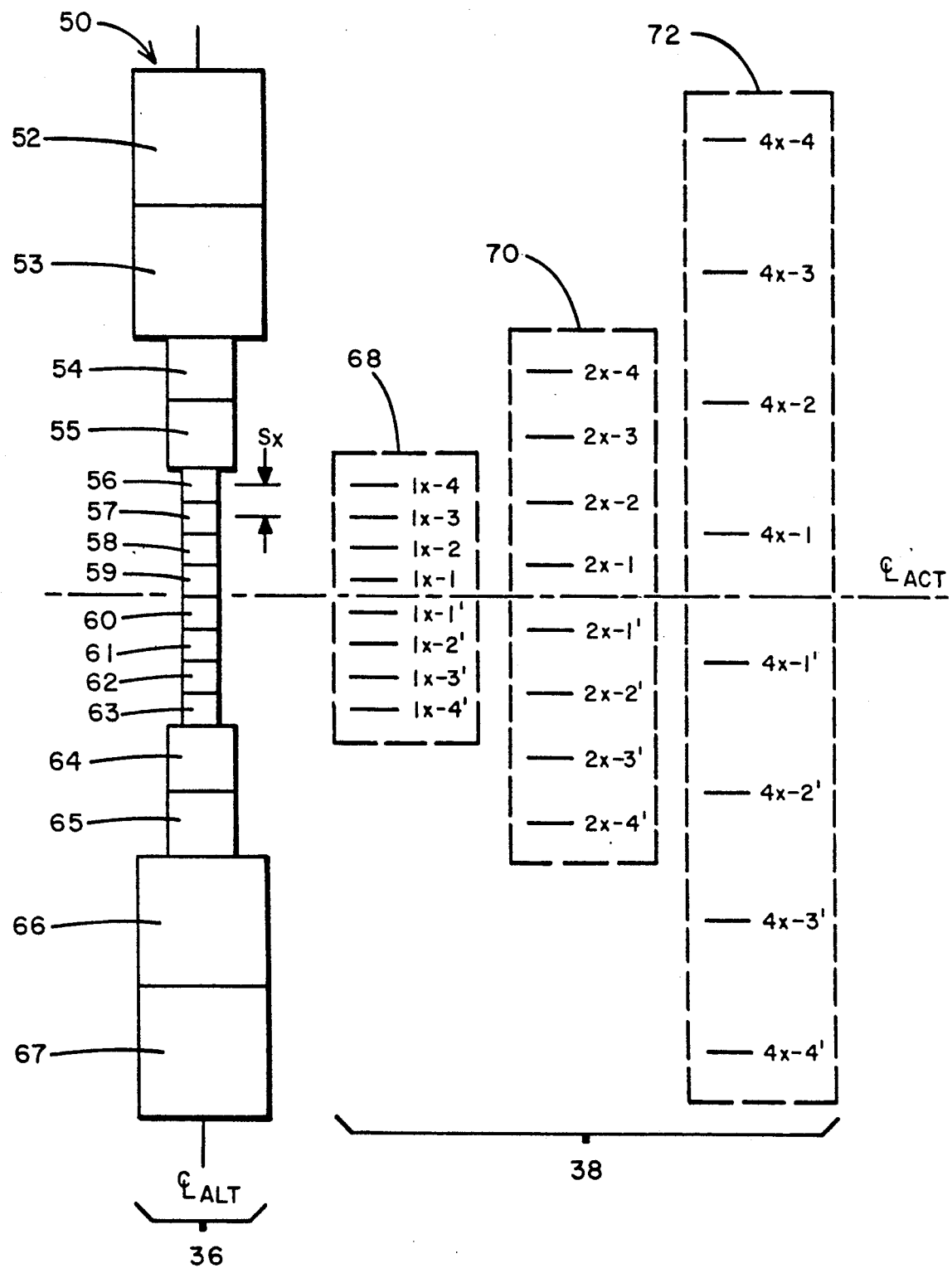
FIG. 9 illustrates a non-linear exponential detector array configured to facilitate the compensated sampling of FIGS. 4A, 4B and 4C with the ALT signal-processing functions of FIG. 8, in which detector elements are arrayed exponentially discretely in groups of two equal-sized elements per octave.

FIG. 9 shows a detector-array configuration suitable for providing electronic zoom to the case described in FIG. 3, where N=8, to efficiently obtain the desired compensation of FIG. 4, also with N=8. The detector array (box 36 in FIG. 8) is indicated generally by numeral 50 and is comprised of individual detector elements 52 through 67. From this array it is possible to synthesize three different size virtual arrays equivalent to array 16 of FIGS. 2 and 5 with N=8. Elements 56 through 63 are spaced at a pitch $S_x$. Magnification is defined to be unity when $S_x$ is equal to $S_{alt}$ in the image plane. The lines shown in box 68 are the centerlines (radiometric centroids) of the detector array elements required for a unity-magnification virtual array, i.e., 1 x size. The required 1x centerlines correspond to the centerlines or radiometric centroids of detector elements 56 through 63 in the ALT direction. The unity-magnification-array size is provided by taking signals directly from elements 56 through 63, i.e., element 56 generates a signal term 1x-4 which corresponds to the signal term T4 of FIGS. 3 and 4. Following the convention we established, the other terms of box 68 generated by elements 56 through 63 correspond to the other T terms of FIGS. 3 and 4.

The centerlines for detector elements of a 2x virtual array, i.e., of size 2x, with a magnification equal to ½, are depicted within box 70. Detector elements 54 and 55 generate terms 2x-4 and 2x-3 which correspond again to the signal terms T4 and T3 of FIGS. 3 and 4. Term 2x-2 is a synthesized term formed by the analog summation of the signals generated by detector elements 56 and 57. It is to be noted that the pitch or spacing between the 2x synthesized detector array elements at 70 has been doubled and, therefore, the magnification is halved. The reason term 2x-2 can be synthesized out of detector elements 56 and 57 is that the sum of their signals equals the signal from the required 2x detector elements, because the radiometric centroid (sampling point) of these two elements, taken together, lies midway between their centroids, which is in the correct geometrical position for the 2x detector element centroid (sampling point). Note that this relation is independent of detector element size, thus applies to detector arrays in which detector size is not related to radiometric centroid pitch or spacing; e.g. size could be constant, limited only by other considerations such as spatial aliasing of the imagery being sampled ALT and radiometric sensitivity (the use of element sizes substantially equal to centroid pitch or spacing is an effective means of providing both anti-aliasing filtering and radiometric sensitivity improvement).

The 4x terms of virtual array 72 are generated in much the same way as for arrays 68 and 70. The virtual array 72 size is 4x and magnification is ¼. Term 4x-2 is synthesized by summation of outputs of detectors 54 and 55. The output term 4x-1 is synthesized by the analog summations of detector elements 56, 57, 58 and 59. Other terms are synthesized in the same manner. In this example where N=8, we find that a total of 16 detector elements in array 50 synthesizes three different binary-related-size virtual detector arrays (68, 70 and 72) of eight elements each, i.e., a total of 24 synthesized detector elements. As N is increased, as in typical applications, the economy of synthesis is dramatically improved. Information theory teaches us that maximum entropy (efficiency) is obtained with the binary-encoding which is the basis of the present invention.

Figure 10A:
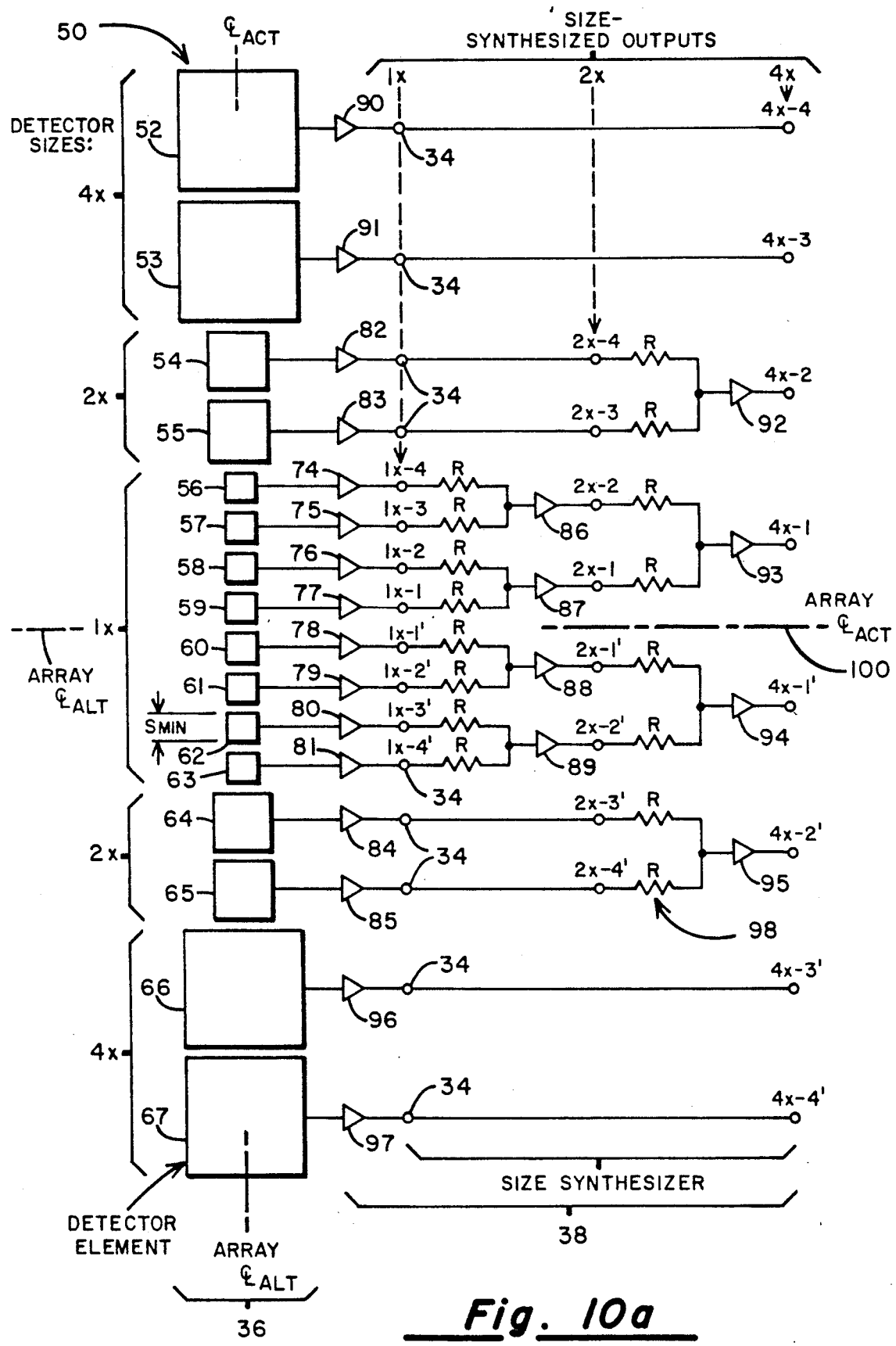
FIG. 10A is a functional schematic implementation of the size synthesizer and the discrete exponential array of FIG. 9.

FIG. 10A shows the circuitry which is combined with a non-linear detector array to perform the binary-size synthesis function. Outputs of preamplifiers 74 through 81 provide the 1x terms directly and additionally provide inputs to buffer amplifiers 86 through 89 to produce synthesized 2x terms. Outputs of buffer amplifiers 86 through 89, plus preamplifiers 82, 83, 84 and 85 provide the 2x terms directly. Additionally, they provide inputs to buffer amplifiers 92 through 95 which provide the synthesized 4x terms. The remainder of the 4x terms are provided directly from preamplifiers 90, 91, 96 and 97.

In summary, referring again to FIG. 10A, the binary-based detector array 36 of FIG. 8 (equivalent to 50 of FIG. 9) and size-synthesizer 38 of FIG. 8 are illustrated by a functional schematic depicting an eight-channel system (N=8) binary-based system. For clarity, only three binary-size groups of eight detectors are shown synthesized from a single array (rather than using three separate, redundant arrays as in prior art). In actual practice, 7 or more binary-size groups are required to cover a range variation of $2^7 = 128$ or more; and N is typically 16 to 64.

The binary relations offer the efficiency and simplicity of requiring only two equal addition networks for the synthesis of the next larger size from two smaller detectors. Preamplifiers 74 through 85 and 90, 91, 96 and 97 provide automatic gain and level control for thermal-signal-responsivity equalization as is common in IRLS practice. Buffer amplifiers 86 through 89 and 92 through 95 provide impedance isolation for resistive addition networks indicated generally by numeral 98.

The three groups of detectors have sizes of 1 x $S_{min}$, 2 x $S_{min}$ and 4 x $S_{min}$, where $S_{min}$ is the size of the eight smallest detectors (none of which are themselves synthesized). It is evident that any practical size array can be configured by continuing the synthesis procedure with 8x, 16x, etc. detector sizes. It will also be evident to those skilled in the art that the symmetry about the ACT array centerline (CL) 100 will offer practical advantages in optical design. That is, when the optical axis is placed on CL 100, it minimizes or eliminates the need for off-axis corrections because detector sizes increase more rapidly than off-axis optical aberrations.

There is also a very practical electronic design advantage in that electronic multiplexer cross-talk and frequency-response limitations are halved with each doubling of detector size, given that only half of the number of multiplexed lines per multiplexer are required and only half the frequency response is required with each doubling of detector size.

It will be further evident that N (the number of recording channels) can be any even integer equal to 4 or greater, for any array symmetrical about CL 100. This follows from: for N=4, there are two 1x detectors on each side of CL 100, and each new size adds one detector each side of CL 100, with each new size being twice the preceding size. Without symmetry about CL 100, viz. with only half the array on either side of CL, a given array half must be doubled in length, and N can now be any integer equal to two or greater.

Further, N2: the number of detector elements per octave need not be 2, nor even an even number; FIG. 10D shows the synthesis for N2=3, an odd number.

Figure 10B:
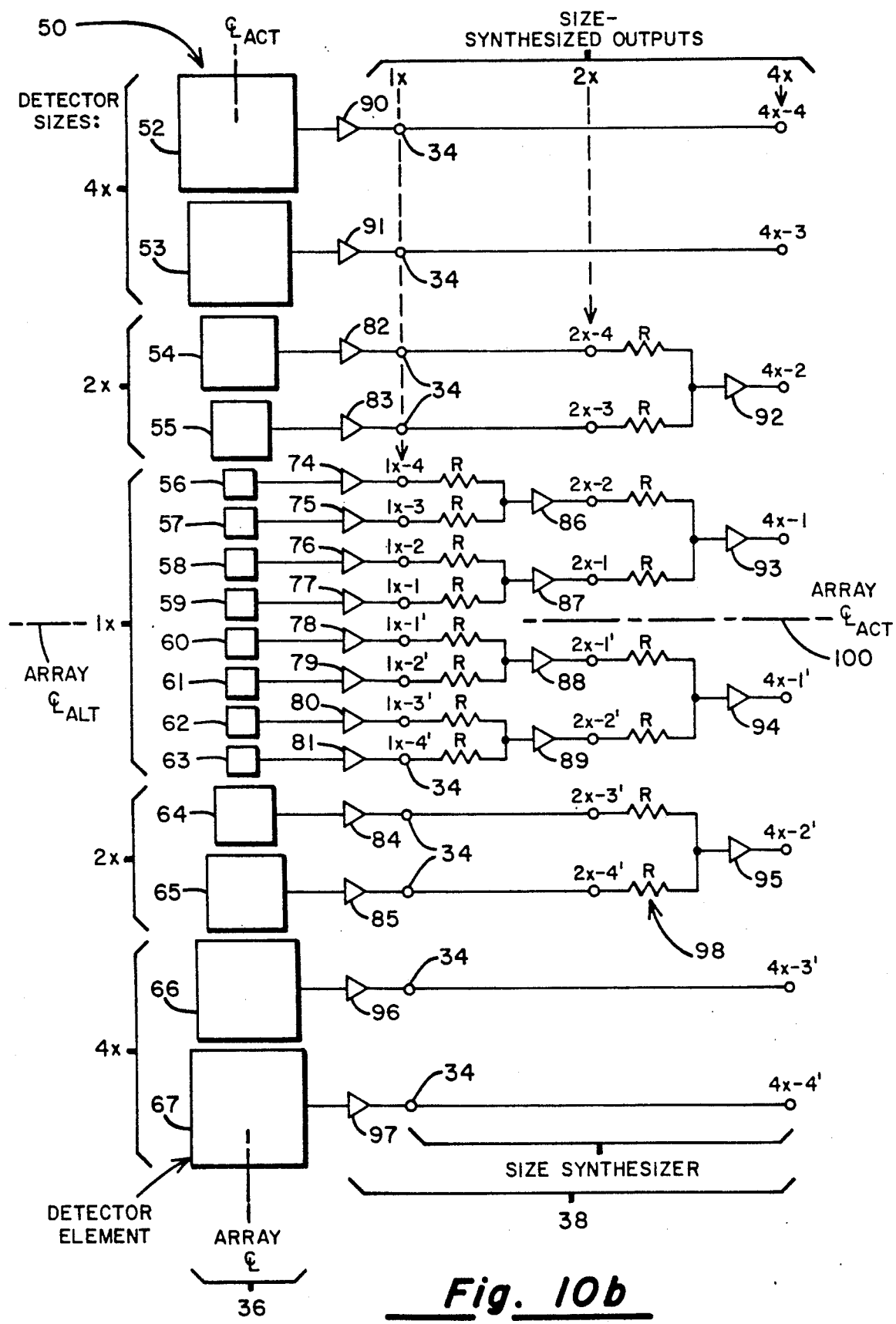
FIG. 10B is an alternate configuration of the discrete exponential detector array of FIGS. 9 and 10A, in which elements are arranged in a continuous exponential function.
Figure 10C:
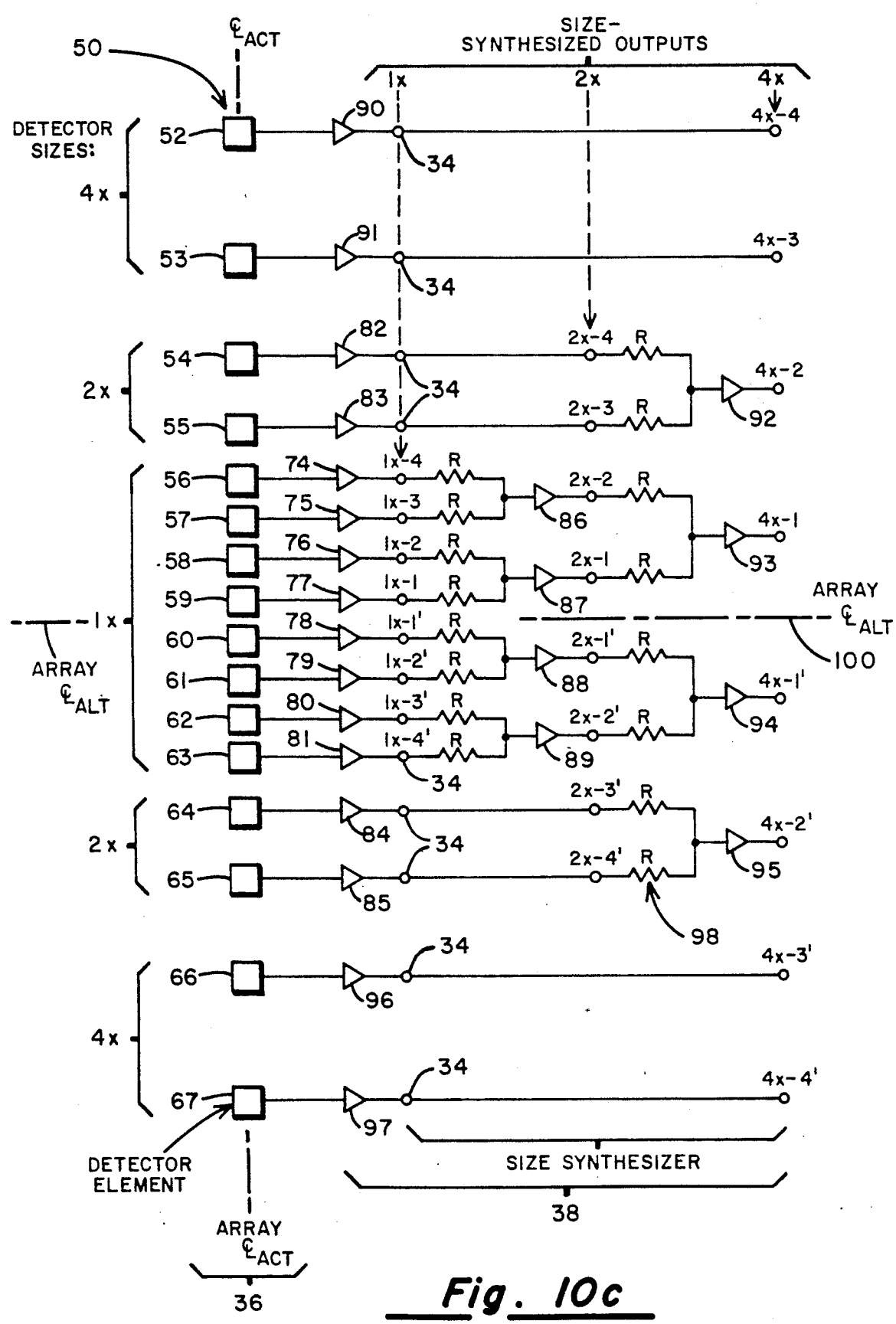
FIG. 10C is an alternate configuration of the discrete exponential detector array of FIGS. 9 and 10A, with all equal-size detector elements on the same centers.
Figure 10D:
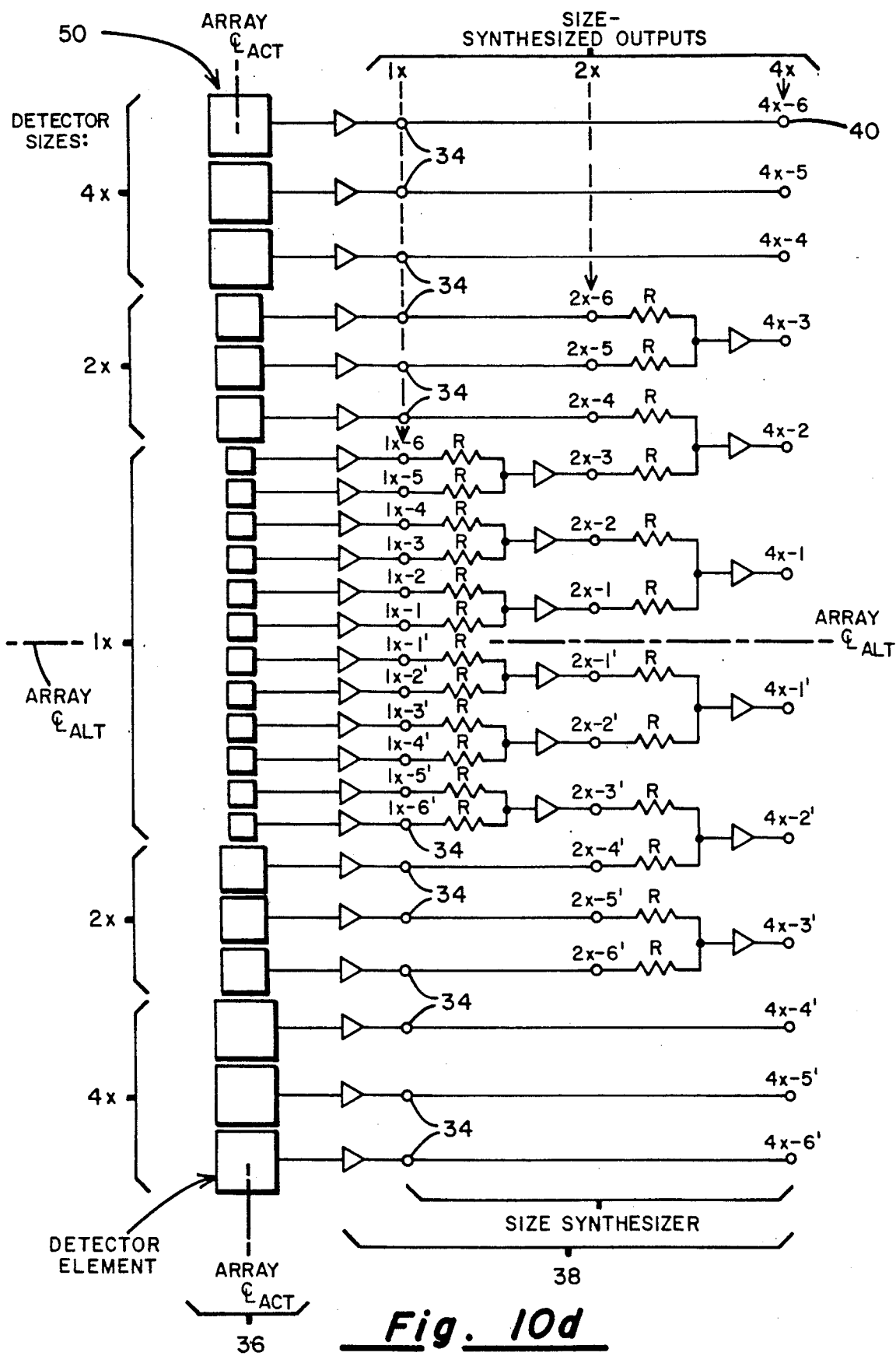
FIG. 10D is an alternate configuration of the discrete exponential detector array of FIGS. 9 and 10A, with three equal-sized elements per octave and the corresponding functional schematic implementation of the size synthesizer.

In consideration of the image-sampling principles taught previously, it will be evident that the detector elements' radiometric centroids determine the desired sampling points, thus detector element sizes can be varied continuously as in FIG. 10B, or can be constant as in FIG. 10C. This provides some practical trade-offs. The detector arrays of FIGS. 10A and 10B, with element sizes substantially equal to element spacings, inherently provide effective spatial ALT anti-aliasing filtering; the array of FIG. 10C offers ease of fabrication. The constant 1x detector sizes shown are typically at the limits of practical yields from fabrication capability and radiometric detection requirements.

Finally, it will be evident that a non-binary-based array and size-synthesizer is feasible with the use of two or more additions for the synthesis of each size by weighted sums for a proportional mixing of detector signals. The binary-based array is a special case of the exponential array with exponential base 2. Thus, other bases than two and other proportional mixing of signals are within the teachings and scope of the present invention.

Figure 11:
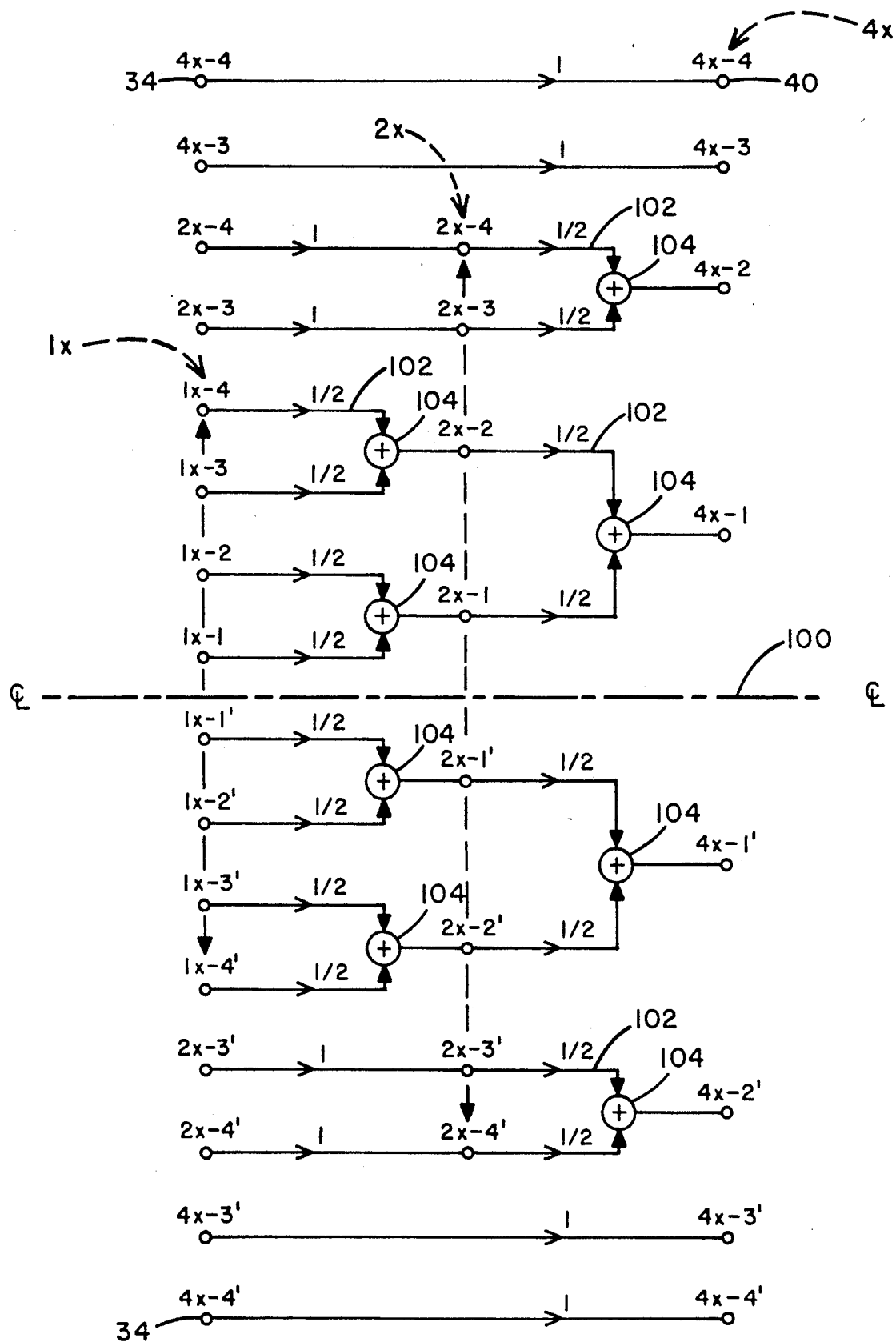
FIG. 11 is a binary-tree operational diagram of FIG. 10 for the synthesis of integer detector-element sizes.

Referring now to FIG. 11, the operational specifications equivalent to the schematic of FIG. 10 are defined using conventions typically found in signal-flow diagrams. The input terms correspond to the preamplifier outputs of FIG. 10. The 50/50 weightings are indicated by the legend designation "$\frac{1}{2}$" beside the multiplier arrows 102 on the signal-flow lines. The summing nodes 104 are indicated by circles with a "+" inside The primed signals below CL 100 are the mirror images about CL 100 of the unprimed signals above CL 100.

Figure 12:
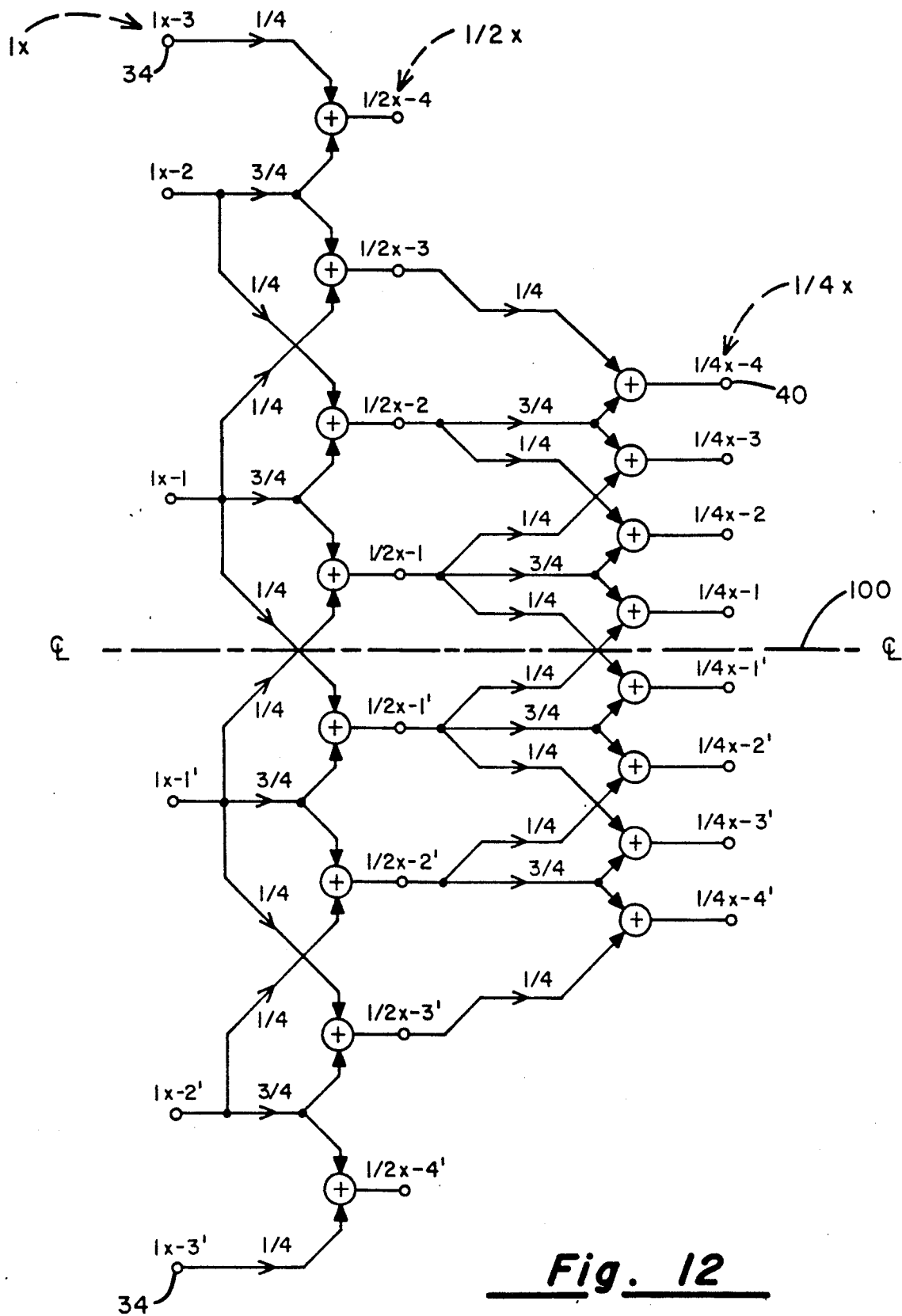
FIG. 12 is a binary tree operational diagram of FIG. 10 for the synthesis of fractional detector-element sizes.

Referring now to FIG. 12, similar specifications are given for "sub-pixel" sizes of $\frac{1}{2}$x and $\frac{1}{4}$x, with 75/25 weightings of $\frac{3}{4}$ and $\frac{1}{4}$ which represent the sample positions of the next smaller size relative to the next larger size for an even number of detectors, as used in these examples. Again, the input terms correspond to preamplifier outputs of FIG. 10, specifically the 1x terms.

With an odd number of detectors, one detector lies on the CL 100 and the division is simpler (obviously 50/50). With a minimum size of $\frac{1}{4}$x, $S_{min}$ equals $\frac{1}{4}$x rather than 1x. The "sub-pixel" synthesis procedure can obviously be continued for $\frac{1}{8}$x, 1/16x, etc. with the smallest size becoming $S_{min}$.

In general, these weightings for detector synthesis are determined by the required location of detector centers (radiometric centroids) being synthesized from other detectors. This generally imposes a simplifying requirement that the radiometric centroid of each detector element, or group of elements used in the synthesis of a detector element, lie on the ACT centerline (optical axis) and further be positioned relative to each other on the ALT centerline by the period $S_{alt}$. The detector array geometry shown in FIG. 10 satisfies these criteria. If the radiometric centroids of all detector elements do not lie on a single ACT centerline, their differential offsets must be compensated for by differential delays matched to the given IRLS scan rate $\Omega$.

The fundamental principle of the present invention is that the elements of the detector array take samples of the Fourier content of the imagery, and that these samples can be interpolated with a first-order curve fitting, i.e., a simple linear interpolation, to determine the sample which would be taken by a synthesized detector. Thus, it is seen that it is the positions of the radiometric centroids, usually the physical centers, of the detectors that is fundamental with regard to sampling requirements rather than the detector sizes. Specifically, it is the sampling interval (spacing) $S_{alt}$ that is fundamental to the detector synthesis of FIGS. 9 and 10, rather than detector size (1x, 2x, 4x, $\frac{1}{2}$x, $\frac{1}{4}$x) which has been referred to herein to introduce the principle with a simpler initial concept. The detector sampling intervals (spacings $S_{alt}$ are shown exactly or approximately equal to the detector sizes in FIGS. 9 and 10, but detector sizes can be smaller or constant (as in FIG. 10C) and the fundamental principle will still be satisfied. However, there are several practical reasons for making detector sizes and spacings equal. First, use of detector sizes equal to the interval spacings, $S_{alt}$, is a very simple means for specifying the exact locations of the detectors. Second, in the ALT direction, detector sizes equal to the spacings act as a very effective ALT "anti-aliasing" spatial filter which rejects Fourier frequency content beyond the Nyquist limit. Third, it is usually desirable to have the same ACT detector dimensions as ALT to maintain constant detector impedances throughout the array. Fourth, thermal-noise limits are minimized. Thus, FIGS. 9 and 10 represent a practical as well as illustrative example.

In summary, the detector sizes could differ from the spacings without departing from the spirit and scope of the present invention. For example, they could all be of equal widths radiometrically (one practical case), or they could all be of equal sizes and off-axis defocus could be designed to provide the required ALT anti-aliasing spatial filtering.

Synthesis of virtual-detector array signal terms ranging from $\frac{1}{4}$x to 4x has now been described. In FIG. 8, all of these synthesized-signal terms are provided as inputs to the size select multiplexer 42. This multiplexer is indicated functionally in FIG. 13 as rotary switch 106 representing a high-speed electronic multiplexer. The value of the mantissa "m" of the ALT-size binary-scaling control signal on line 31 in FIGS. 7 and 13 determines which binary size of the synthesized signals is selected at the outputs of size-select multiplexers 42, comprising signal terms S-4 through S-4'. Preferably, the size-synthesizer circuitry and the size-select multiplexer would be combined into a single integrated circuit.

Figure 13:
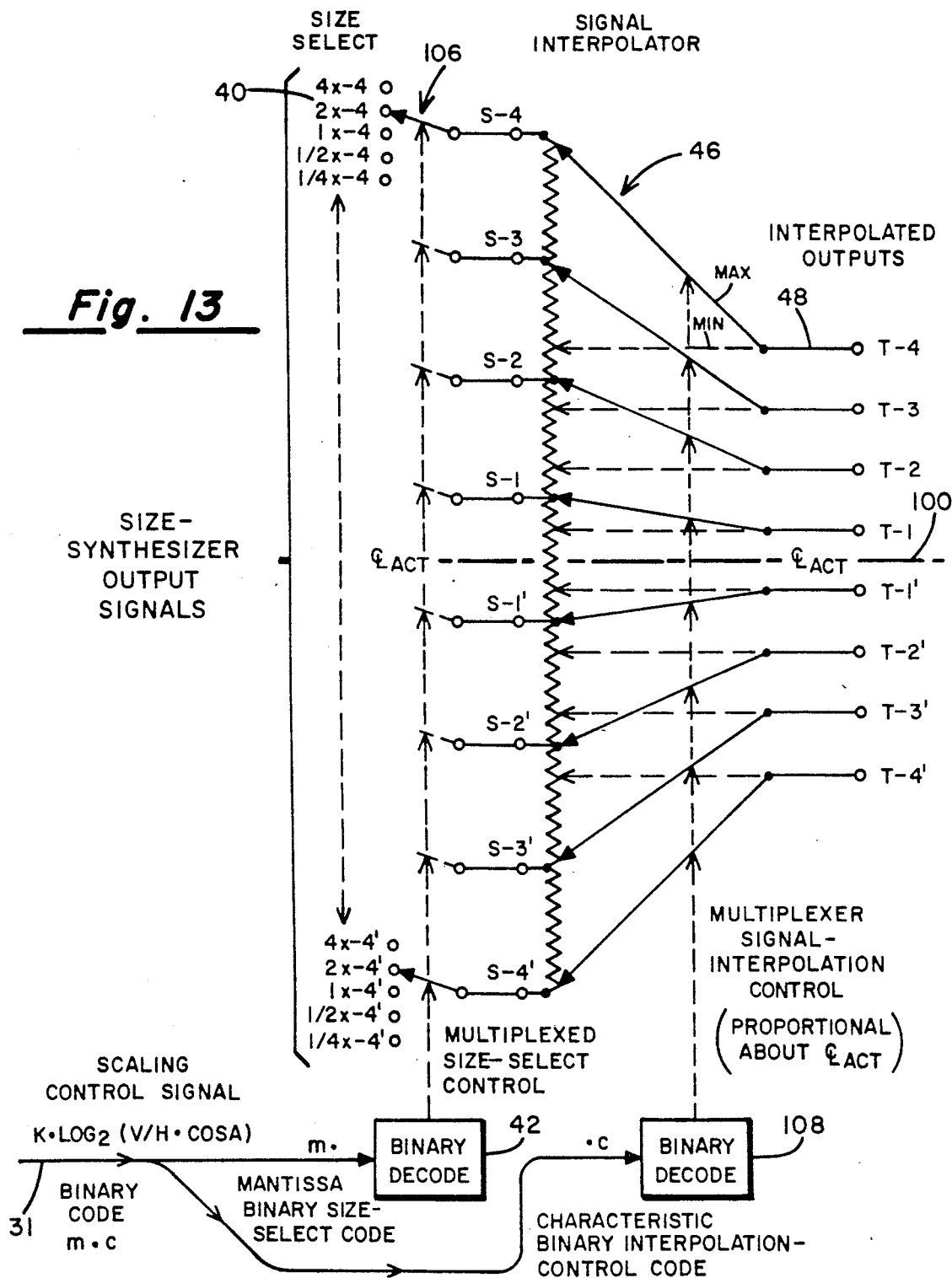
FIG. 13 is a functional schematic of the remaining two functional blocks of FIG. 8, consisting of size-select multiplexers and a signal interpolator multiplexer.

The signal interpolator 46 of FIGS. 8 and 13 provides a virtually continuous resistive divider interpolation of the size-select multiplexer output signals 44 to provide an effective maximum size reduction by a factor of two, i.e., from full size to half size, with the degree of interpolation controlled by the characteristic: "c", the fractional component of the scaling-control signal "m.c", on line 31 of FIGS. 8 and 13. The output signals from the signal-interpolator multiplexer taps T-4 to T-4' correspond to the eight signal channels of FIGS. 3 and 4.

Having described the function of signal interpolator, the dimension of the detector array $S_x$ of FIG. 9 can now be fully related to the term $S_{alt}$ in the image plane. Specifically, for unity size and unity interpolation, $S_{alt}=S_x$. For minimum size, minimum interpolation, $S_{alt}=\frac{1}{8} S_x$. For maximum size and maximum signal and unity signal interpolation, $S_{alt}=4S_x$. The ALT electronic mapping/sealing has the effect of making a simple, linear detector array continuously elastic, stretching it from its minimum to something 32 times larger.

The signal interpolator is shown conceptually in FIG. 13 as a tapped potentiometer with multiple wipers, each tap connected to an S input term, each wiper connected to provide a T output term with each wiper moving proportionally from CL 100 under ".c" control. Note, for example, that for unity interpolation, the wiper of output term T-4 is positioned at the node of S-4. For an interpolation of 0.5, the wiper associated with output T-4 is positioned on the potentiometer such that signal is a weighted combination of signals S-3 and S-2 where the weighting is $\frac{3}{4}$ S-2 and $\frac{1}{4}$ S-3. The result of this interpolation is that the output signal T-4 is the same electrical signal that would occur if the detector or detectors generating the signal S-4 had been moved half-way to the ALT centerline 100. The others wipers move proportionally in the same manner to spatially scale the signals by a factor of two around ALT centerline 100. A number of analog or digital techniques may be employed to electronically accomplish the desired interpolation and these will be described when FIGS. 13 through 22 are considered.

Figure 14:
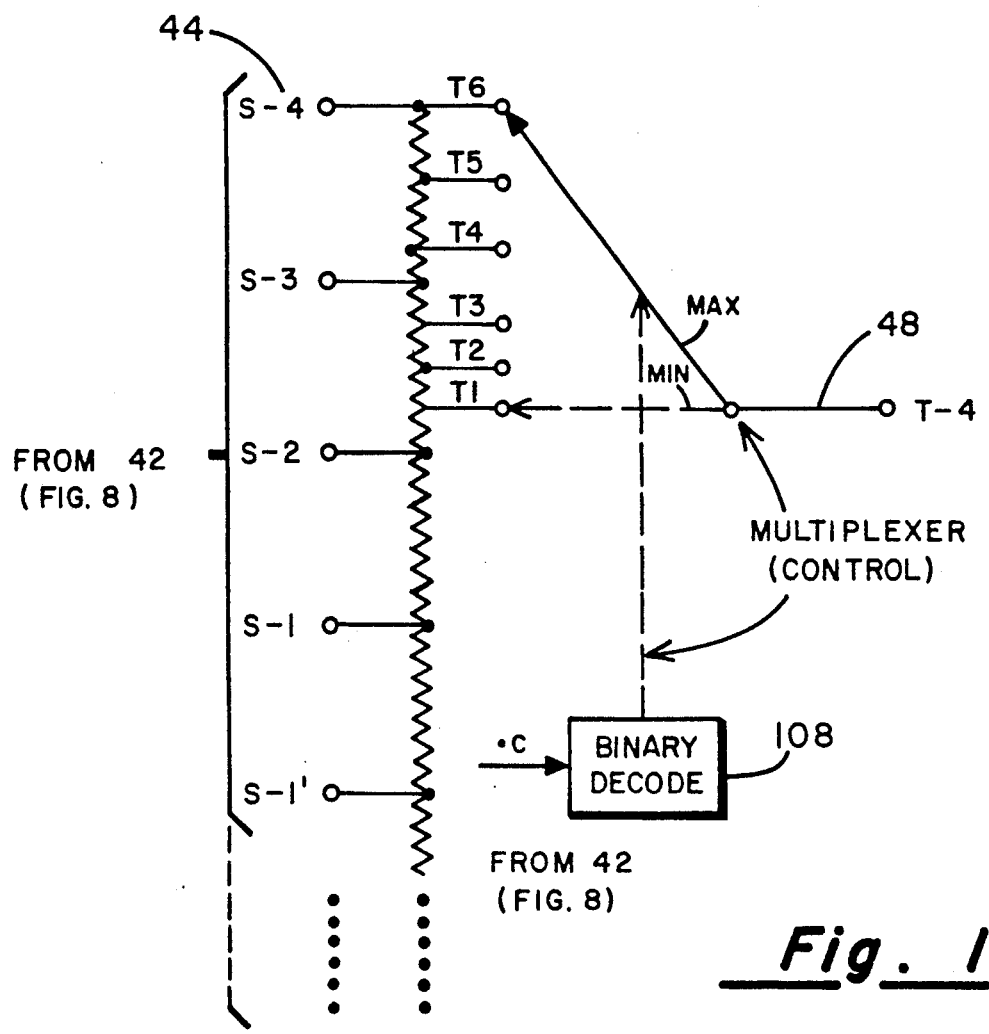
FIG. 14 is a practical embodiment of the signal-interpolator schematic of FIG. 13, which uses multiplexer taps on a resistor signal divider for discrete digital control.

FIG. 14 shows one method of a digitally-controlled discrete-switching approximation to continuous signal interpolation, in which the characteristic ".c" of the scaling control signal is decoded at 108 to select one of the resistive taps labeled T-1 through T-6. This method offers the advantage of simplicity for a moderate number of taps, but becomes impractical if very fine or continuous interpolation is desired.

Figure 15:
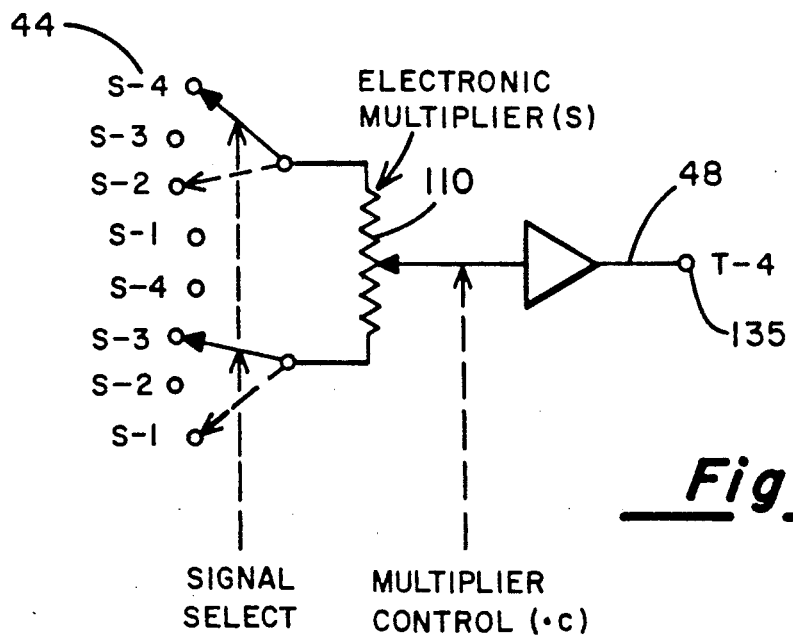
FIG. 15 is an improved embodiment of the schematic of FIG. 13, which uses size-select multiplexers and electronic multipliers for proportional control.

FIG. 15 shoWs a technique which provides a virtually continuous interpolation. The resistive divider 110 is formed through a pair of multiplying digital A-to-D converters (MDACs) which are controlled by the characteristic ".c" of the scaling control signal so as to accomplish the desired result.

The foregoing scaling-function description may be summarized by referring again to FIG. 13. The N size-select multiplexers 106 of size-select module 42 switch N signal interpolator taps S-4 to S-4' to N size-synthesized signals 40. The binary size selected is determined by the mantissa "m", i.e., the integer part of log (V/H COS(A)) and other constant parameters as specified in FIG. 7, which is the binary number decoded by each multiplexer. The mantissa "m" is scaled to the smallest size $S_{min}$ (1x for integer sizes only and $\frac{1}{2}$x for fractional as well as integer sizes). Thus, size switching occurs at each octave increase in computed size required. Binary logarithmic octave size selection minimizes hardware requirements for a required dynamic range.

The characteristic ".c", i.e., the fractional part of "m.c"=$\log_2$ (V/H COS(A)) controls via the binary decoder 108 the selection of signal-interpolator multiplexer taps so as to connect the interpolated output lines T4 to T4' with S-4 to S-4', respectively, when ".c" is maximum, and with points halfway to CL 100 from S-4 to S-4' when ".c" is minimum, and in between these points proportional to $2^{\cdot c}$. This can be implemented with a multiplexer decode of ".c", with discrete taps proportional to $2^{\cdot c}$, as in FIG. 14 or with electronic multipliers configured as an electronic potentiometric divider of selected signals, as in FIG. 15. These implementations provide tradeoffs between simplicity and accuracy.

Figure 16:
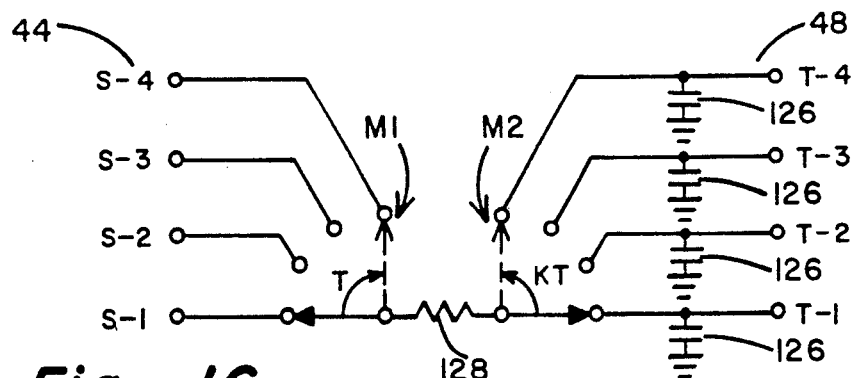
FIG. 16 is a simplified, improved embodiment of the functional schematic of FIG. 13, which uses multiplexers for time-division multiplication with proportional control.
Figure 17:
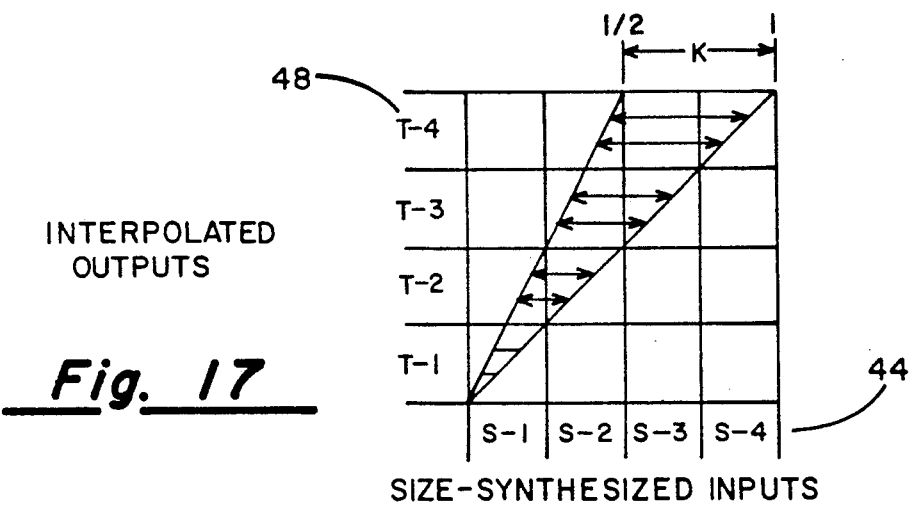
FIG. 17 is a phase diagram defining the time-division multiplication function of FIG. 16.
Figure 22:
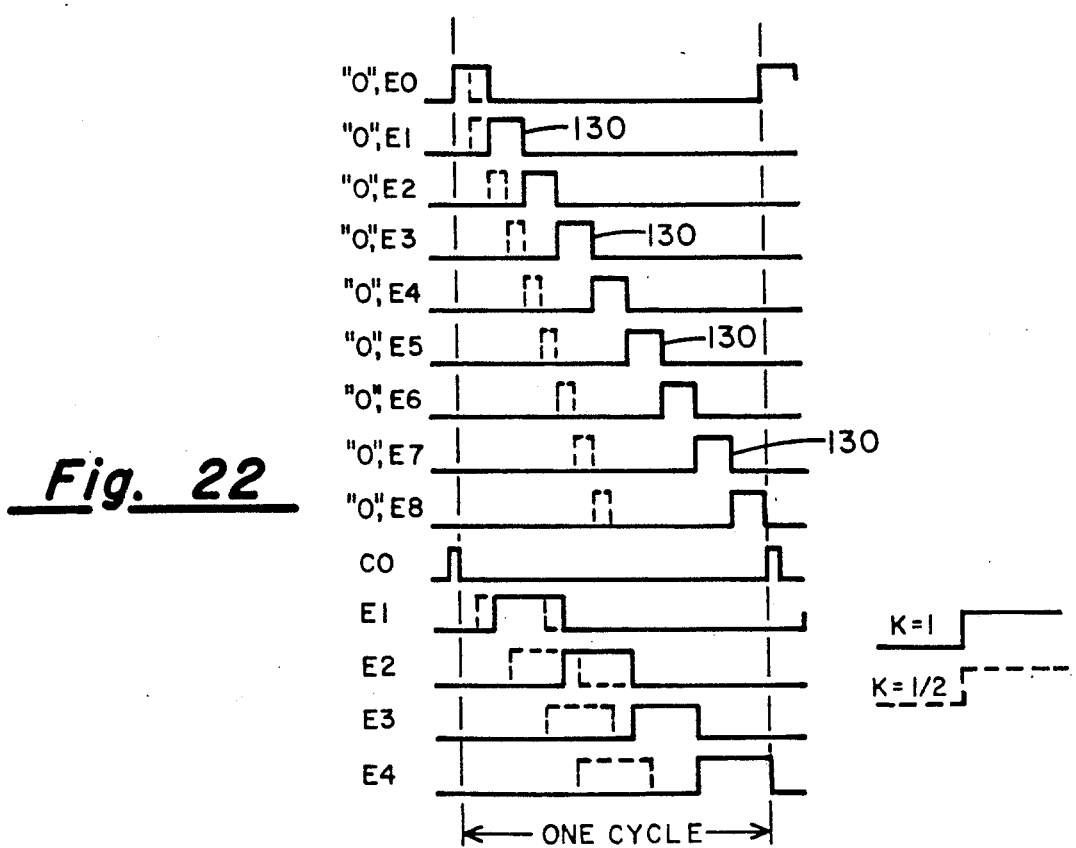
FIG. 22 is a switch-control timing diagram useful in the understanding of the multiplexer control of FIG. 21.
Figure 18A:
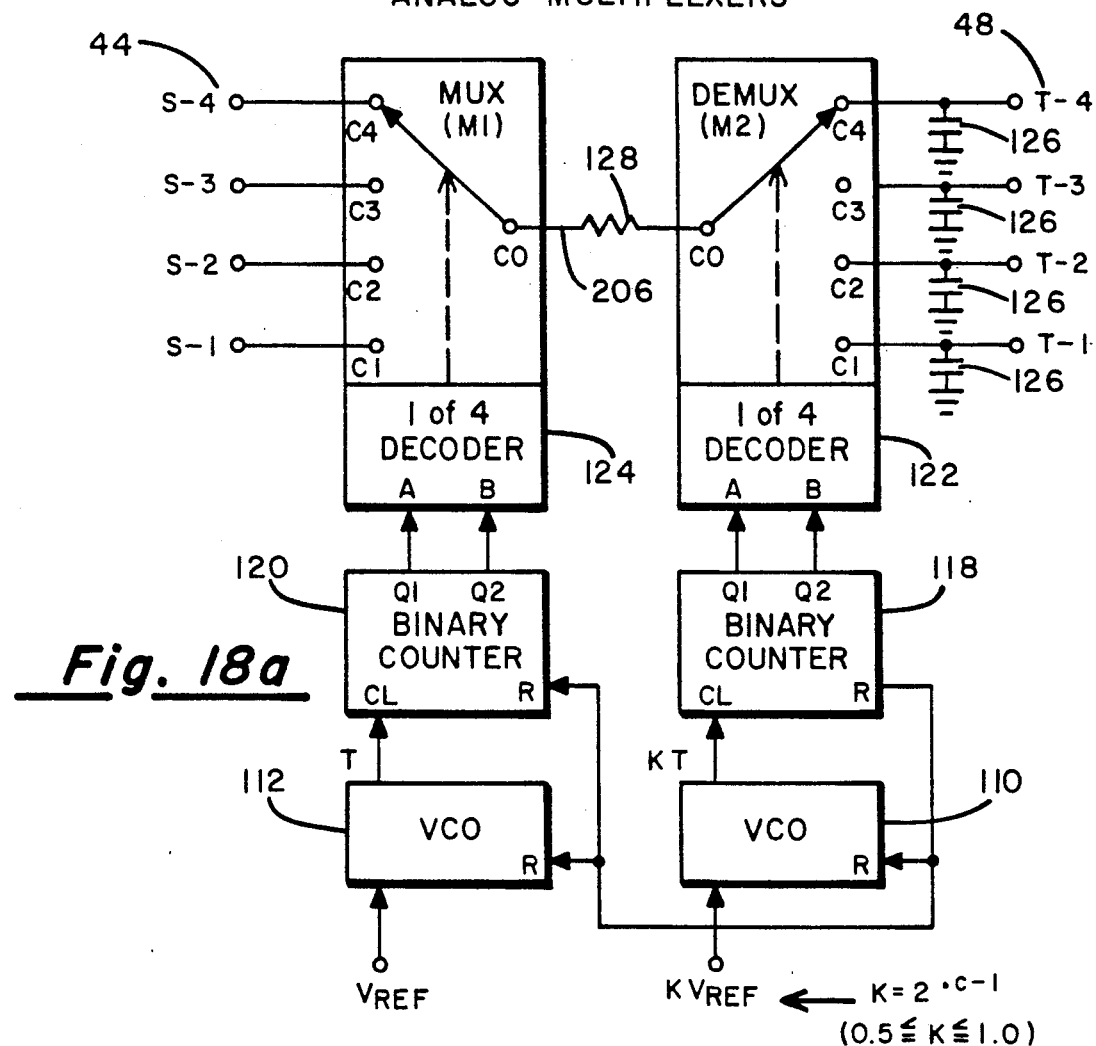
FIG. 18A is a multiplexer control block diagram for the control of the multiplexers of FIG. 16.
Figure 18B:
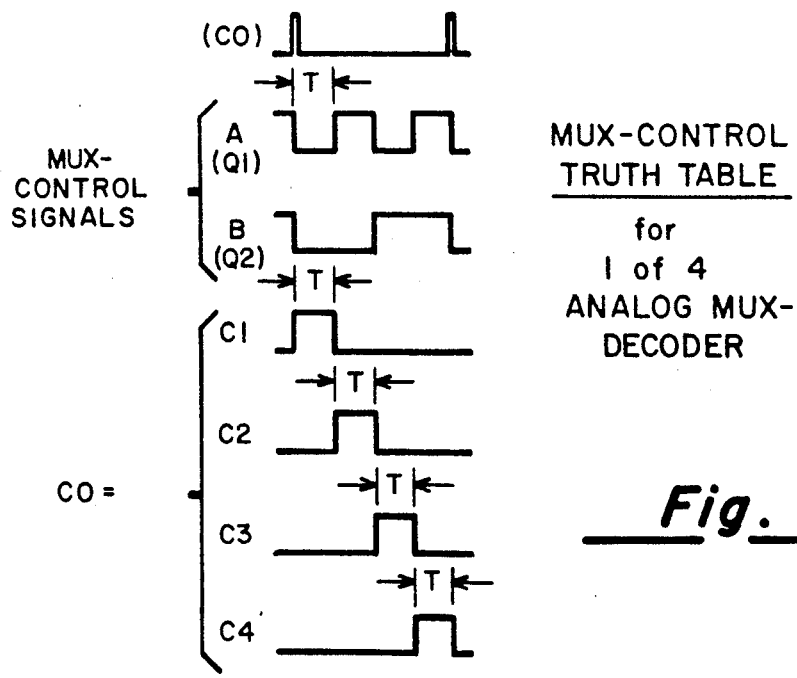
FIG. 18B is a multiplexer-control truth table for the multiplexers of FIG. 18A.
Figure 19:
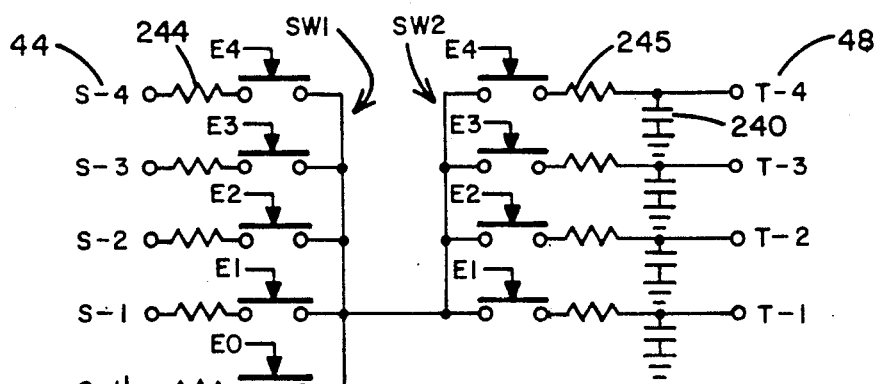
FIG. 19 is a precision embodiment of the simplified schematic of FIG. 16, which combines electronic switches with time-division multiplication for precision control.

A second category of interpolator 46 uses back-to-back multiplexers or electronic switches as in FIGS. 16 through 22, which provide a continuous, proportional scaling by time-division multiplication in which input signals S-1 to S-4 are sequentially connected to output lines T-1 to T-4, beginning with S-1 and T-1 and continuing at rates set by identical voltage-controlled oscillators (VCOs) 110 and 112 (FIGS. 18A and 21) with a frequency ratio: $K=2^{\cdot c-1}$ to linearize the logarithmic fraction ".c". The switch control of FIGS. 19 through 22 uses "one-shot" multivibrators 114 and 116 as constant delays to provide perfect linear interpolation, while the multiplexer configuration of FIGS. 16 through 18 is simpler, again providing tradeoffs between simplicity and accuracy. The phase diagrams of FIGS. 17 and 20 and timing diagram of FIG. 22 provide comparisons and specifications of operation.

Figure 21:
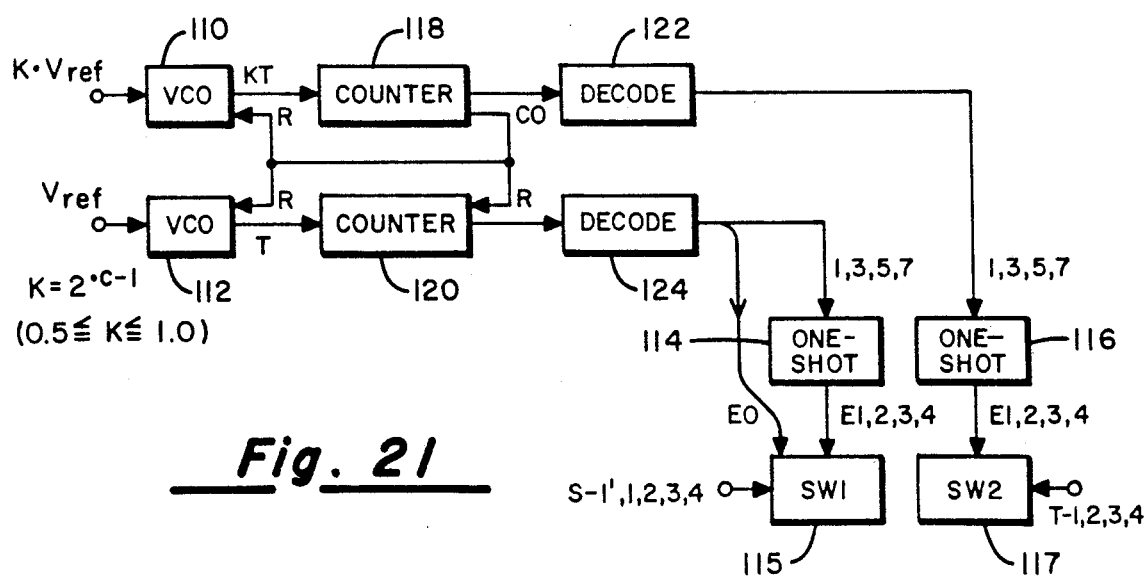
FIG. 21 is a multiplexer-control block diagram for the control of multiplexers of FIG. 19.

In FIGS. 18 and 21, the VCO 110, controlled by $KV_{ref}$ where $K=2^{\cdot c-1}$ and $V_{ref}$ is a fixed voltage reference, has an output period equal to KT, where T is the output period of the VCO 112 controlled by $V_{ref}$. The outputs of VCOs 110 and 112 clock binary counters 118 and 120 until counter 118, clocked faster by the shorter KT output period, reaches its full count, causing a carryout output (CO) to reset both counters 118 and 120 and VCOs 110 and 112. Decoding of binary counters 118 and 120 is performed by decoders 122 and 124 of the standard type found in integrated-circuit multiplexers well known to those skilled in the art. They may be identical to decoders 42 and 108 in FIGS. 13 and 14 previously discussed.

The function of the VCOs is to provide an output frequency with a period directly and linearly proportional to the input, which requires a digital-to-analog conversion from the digital control word. Conceptually, this function could be provided directly with a digital preset counter very simply; however, typical system requirements of sampling rates and resolution will often require upwards of GHz clock rates, so the more conservative VCO is suggested. As the state-of-the-art in digital design at these high frequencies becomes more commonplace, hence more economical, the all-digital functional equivalent will be preferred, having the advantage of precision control. Currently, the VCO offers higher resolution for the required sampling rates.

In FIG. 18A, decoders 122 and 124 directly control interpolation multiplexers as defined by the state-phase diagram of FIG. 17. This diagram shows the timing of the S-1 to S-4 connections to T-1 to T-4 whereby the average values of the multiplexed signals connected are integrated by sample-and-hold capacitors 126 (FIGS. 16 and 18A) with averaging time constant controlled by resistor 128 (FIGS. 16 and 18A). However, interpolation regions are proportional to K, a limitation in critical applications.

Continuous interpolation with full resolution at lower values of K can be provided by use of constant input periods as well as constant output periods. This is shown by the switch control diagram in FIG. 21 in which decoders 122 and 124 trigger constant period "one-shots" 114 and 116 which control the states of the interpolation switches as specified by state-phase diagram, FIG. 20, and timing diagram FIG. 22, which shows odd-numbered decodes "1, 3, 5, 7" as identified by numeral 130, triggering the one-shots so as to generate the switch control signals "E1, E2, E3, E4" at the times indicated. Also, mirror image input signal S-1' is switched by decode state "O"="E0", as specified by phase diagram, FIG. 20, and switch-control timing diagram FIG. 22, to provide precise interpolation toward CL 100 for output signal T-1. Switch control signals "E1, E2, E3, E4" control the multiplexer switches of FIG. 19, in which resistors 244 provide input switch isolation, and resistors 244, 245 and capacitors 240 provide sample and hold integration of the multiplexed signals.

It will be evident that two identical pairs of interpolators 46 (FIG. 8) as detailed in FIGS. 14 through 22 are required to provide the full function specified by the signal interpolator 46 shown in FIGS. 8 and 13 with the preferred symmetrical array of FIGS. 9 and 10.

Preferably, the signal interpolator circuitry of the preferred interpolation technique would be combined into a single integrated circuit.

The principles and techniques for digital control of $S_{alt}$ (ALT sampling interval) using ALT-Size-Control word: "m.c", with the two-stage synthesis of FIG. 8 taught up to this point, can be expanded to provide a single-stage synthesis and interpolation with back-to-back multiplexers (similar to FIGS. 18A or 21) in which detector-array signals shown on line 34, FIG. 8 are multiplexed to produce the selected and interpolated signals shown on line 48 of FIG. 8.

Figure 23:
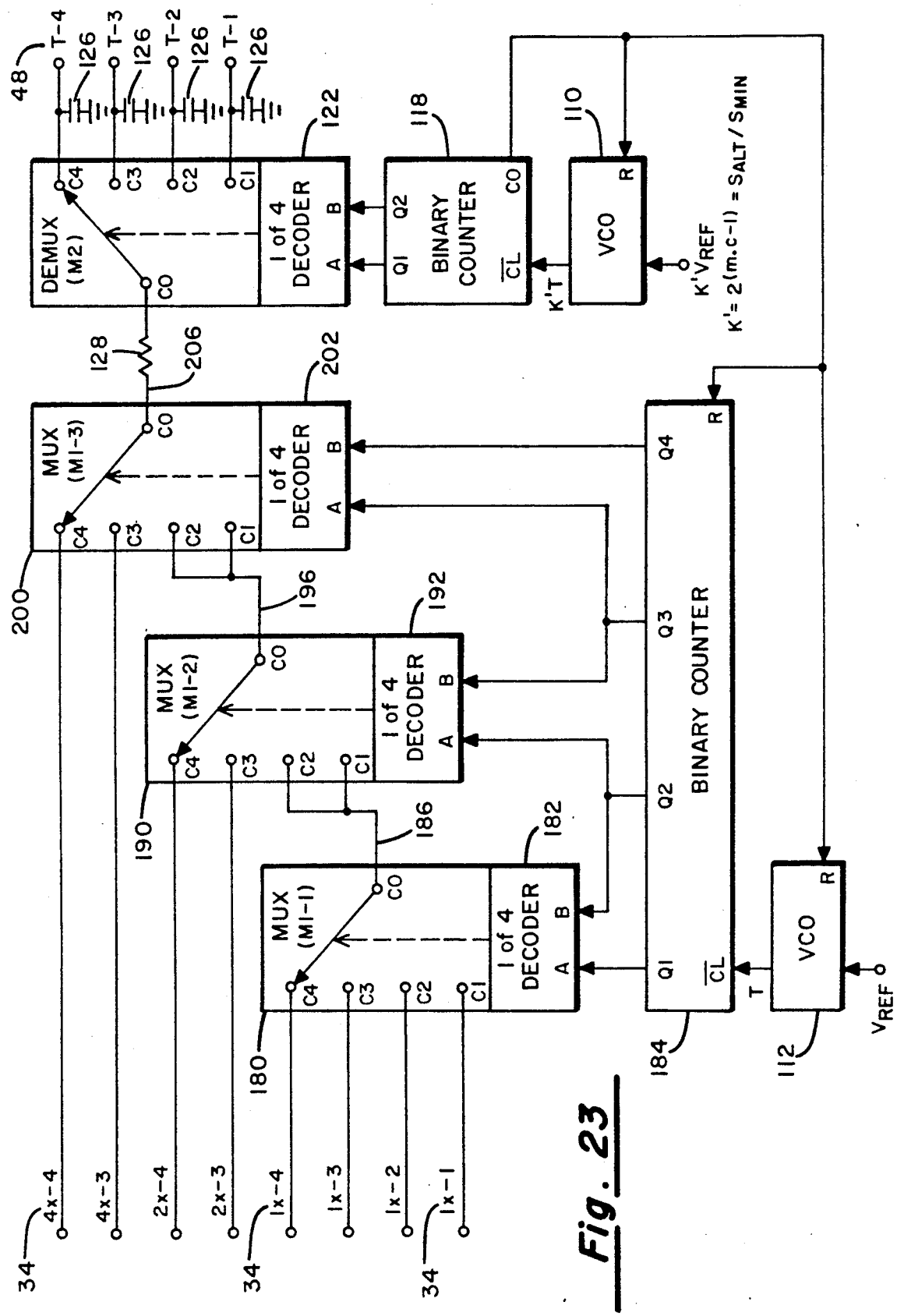
FIG. 23 is a wide dynamic range time-division multiplexer and control block diagram of an ALT-signal processing technique which is an alternative to the two-stage size synthesis and interpolation processing functions of FIGS. 8 to 22, which uses the decoding inherent to cascaded analog multiplexers to cover the entire dynamic range.

FIG. 23 shows an example of the single-stage synthesis and interpolation technique in which the interpolation input multiplexer M1 of FIG. 18A is replaced with a binary cascade of multiplexers 182, 192 and 202 controlled by binary counter 184, which replaces counter 120 of FIG. 18A. In FIG. 23, input multiplexers 182, 192 and 202 select detector-array signals 34, and also interpolate them as previously described in relation to FIG. 18A; however, VCO 110 is controlled to produce a period K'T, where $K'2 = 2^{m.c-1} = S_{alt}/S_{min}$ to cover the three-octave range of 1x, 2x and 4x selection, in addition to interpolation which only required $K=2^{c-1}$ in over one octave in FIG. 18A. Otherwise, the teachings of FIG. 18A are applicable.

Again, it will be evident that two identical pairs of multiplexer sets as shown in FIG. 23 are required with the preferred symmetrical array of FIGS. 9 and 10. Also, each multiplexer set will be preferably be combined into a single integrated circuit for signal-path minimization and the elimination of decoder redundancy (which, however, serves the present tutorial purposes well, because the function of the binary cascade of multiplexers will be self-evident to those skilled in the art, without the need for complex state diagrams).

Figure 24:
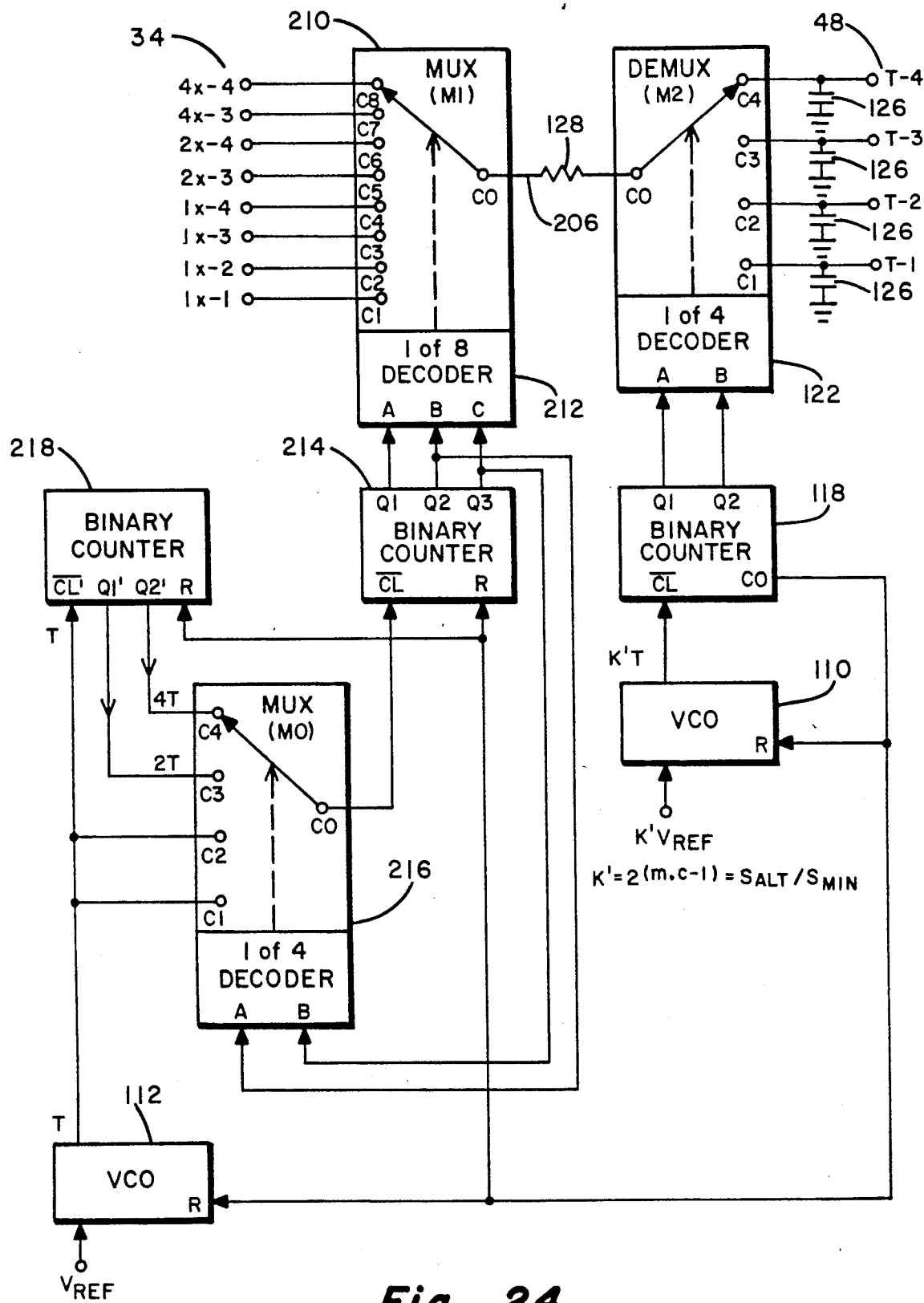
FIG. 24 is a more efficient alternative configuration of FIG. 23 in which the wide dynamic range digital control decoding is completely external to the multiplexers, such that only a single pair of multiplexers is required.

A second example of single-stage synthesis and interpolation is shown in FIG. 24 in which the cascade of input multiplexers of FIG. 23 is replaced by the single multiplexer 210 in which the required binary-multiplexing-control decoding is accomplished externally rather than with the binary cascade of analog multiplexers.

This digital control is provided by digital feedback around binary counter 214 which halves the counter input clock rate each time the counter's count doubles. The digital feedback selects binary-related clock rates from binary counter 218 with multiplexer 216. This performs the same function as the cascade of analog multiplexers in FIG. 23. The rest of the circuitry is the same as FIG. 23, so need not be described.

Figure 25:
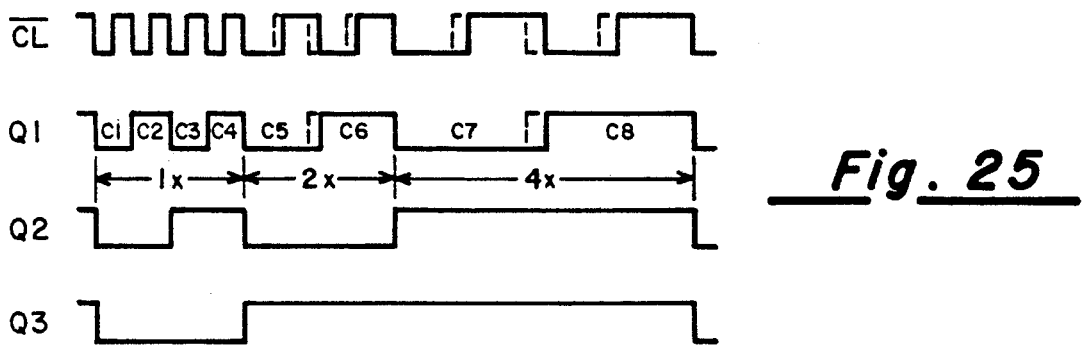
FIG. 25 is a state diagram defining the multiplexer digital control functions of FIG. 24.

A state timing diagram of counter 214 input and outputs is shown in FIG. 25. The solid-line waveforms show uniformly-spaced intervals within each octave, corresponding to the equally-sized detector-element spacings within each octave of detector arrays in FIGS. 10A and 10C, which have identical centroids (and differ only in detector-element size, which has no effect on the process being described).

This illustrates the underlying principle of FIGS. 23 and 24: The input multiplexer performs a linear scan of the array from the centerline; i.e. the centroid of each multiplexer interval occurs at a time proportional to the distance of each detector-element centroid from centerline 100. Sampling times are proportional to sampling distance from centerline. Although these times and distances are non-uniformly spaced, the scan of the input multiplexer is linear. This, with the linear scan rate of the output multiplexer (demultiplexer), provides a one-to-one mapping of inputs to outputs, with scale determined by the ratio of scan rates during a given scan.

Note that the arrays of FIGS. 10A to 10D all have detector-element spacings proportional to their distance from centerline; this makes their distance from centerline: $X_n$ an exponential function of n, the element number from centerline. The array of FIG. 10B is an example of a continuous exponential array, in which all elements follow a continuous exponential function. This array requires the dotted-line waveforms of FIG. 25, which can be generated by the more flexible mapping control of FIG. 26. The other arrays are examples of discrete exponential arrays, in which spacings are constant within each octave to provide simplicity of control by binary logic, as previously illustrated. In all these examples, the exponential is base 2 for simplicity of control, but need not be with the more flexible mapping control of FIG. 26, to be described.

Since the arrays and their multiplexer timing control must be matched, they will be described explicitly in mathematical terms (as well as pictorial, as previously).

The spacing of 1x elements: "$X_1$" provides relative scale; the number of elements per octave (one side of centerline) is "N2"; the element number from centerline is "n"; the distance from centerline to inner boundary of element "n" is "$X_n$". Detector-element centroids of element "n" are midway between "$X_n$" and "$X_{n+1}$" at their arithmetic mean: $(X_n X_{n+1})/2$. The spacing between boundaries of element "n" is "$\Delta X_n$"$=X_{n+1}-X_n$.

Within the inner, linear portion of both continuous and discrete exponential arrays ($n \leq 2 \cdot N2$):

$$X_n = n \cdot (X_1) \tag{4}$$

$$\Delta X_n = X_1 \tag{5}$$

Over the outer exponential portion of the continuous exponential array ($n \geq 2 \cdot N2$), as in FIG. 10B (N2=2):

$$X_n = (N2) \cdot (X1) \cdot 2^{(n/N2 - 1)} \tag{6}$$

$$\Delta X_n = (2^{(1/N2)} - 1) \cdot X_n \quad (7)$$

Over the outer discrete exponential portion of the discrete exponential array (N 2 N2); as in FIGS. 10A, 10C (N2=2) and FIG. 10D (N2=3):

$$X_n = (N2) \cdot (X_1) \cdot (1 + n/N2 - B) \cdot 2^{(B-1)} \quad (8)$$

$$\Delta X_n = (X_1) \cdot 2^{(B-1)} \quad (9)$$

where B is the integer value of (n/N2). Note that element "size" (1x, 2x, 4x, ...) is $2^{(B-1)}$.

The equations also define the requirements for multiplexer timing corresponding to the array parameters. For a given array scanning velocity: Va, the simple relations $$X_n = Va \cdot T_n \quad (10)$$

$$T_n = X_n / Va \quad (11)$$

provide the required timing parameters for FIGS. 23 and 24, previously described and for FIG. 26 which will now be described.

As mentioned, the combination of typical Nyquist rates (sampling rate requirements) and low duty cycles (2/N) would require prohibitively high clock rates for digital frequency control with adequate resolution in FIGS. 18A, 21, 23 and 24, which also require anti-aliasing filters.

Figure 26:
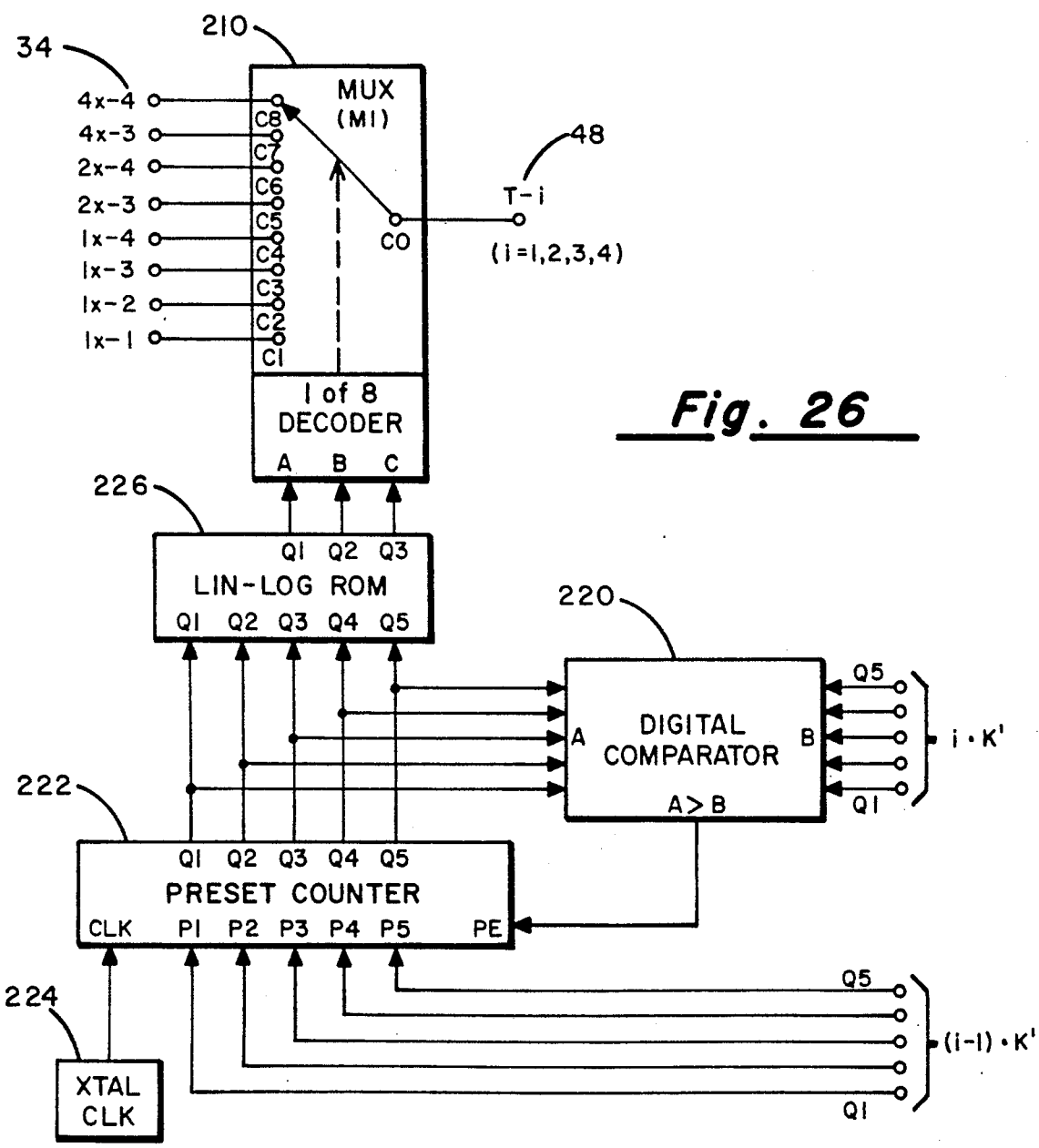
FIG. 26 is a high-efficiency alternate configuration of FIG. 24, which uses a single size-synthesizer,-select,-interpolator multiplexer for each output signal.

These limitations are eliminated in the third example of single-stage synthesis and interpolation shown in FIG. 26. This is a 100% duty-cycle multiplexing scaler which permits full digital control, without the precision and stability limitations of the analog VCO. Each output 48 is provided with a multiplexer 210 to provide time-division multiplication of inputs 34 for scaling and interpolation, as described in the first two examples; however, since each output has its own multiplexer, a 100% duty cycle is achieved.

This permits modest clock rates (several MHz, rather than GHz) and eliminates requirements for anti-aliasing filters and their associated signal degradations.

The multiplexer 210 is controlled by preset counter 222 via LIN-LOG ROM (read only memory) 226 which implements the appropriate equals: (4) through (11) corresponding to the selected array type and parameters, which need not be binary-based due to the flexibility of ROM programming. Clocked by crystal clock 224, counter 222 ramps linearly from lower limit 230 to upper limit 228, which is sensed by digital comparator 220, causing preset to lower limit 230; this cycle repeats continuously. Subsequent low-pass filtering, required for anti-aliasing in the ACT scaling to be described, properly averages the multiplexed signals for precise scaling and interpolation.

Figure 20:
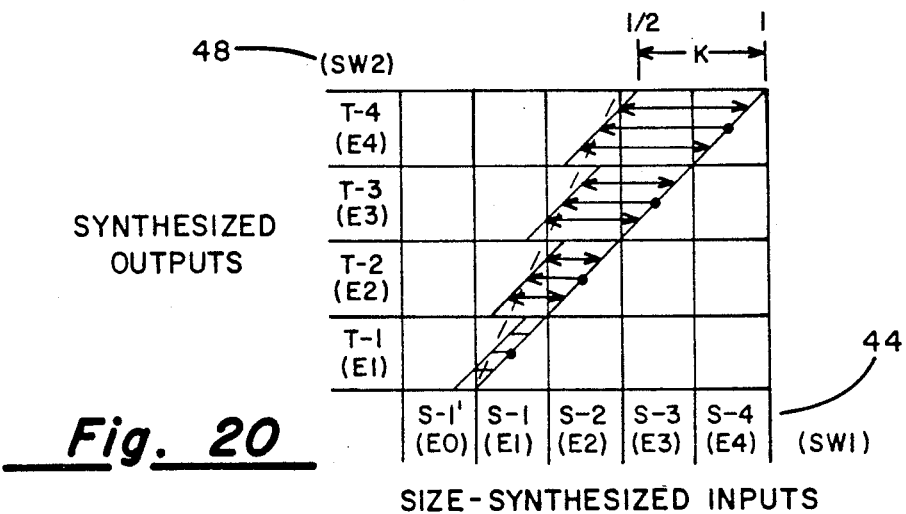
FIG. 20 is a phase diagram defining the time-division multiplication function of FIG. 19.

The indicated upper and lower limits of i·K' and (i-1)·K', where $K' = S_{alt}/S_{min}$, provide the simpler interpolation of FIG. 17 within each octave. When used with the continuous exponential array of FIG. 10B, the ideal interpolation of FIG. 20 is inherently provided; this is the primary advantage of the continuous exponential array. In this case, only the subpixel interpolation within the inner, linear (1x) portion of the array would require the averaging limits of FIG. 20 for ideal interpolation, which must be traded off against the real-time computation requirements and resultant hardware-cost increase.

Several ALT scaling techniques of compensated sampling for mapping detector signals to synthesized array signals, with a practically continuous scaling that meets the objectives of FIG. 4 for contiguous imagery in successive scans, have been presented. Selections of the optimum combinations of techniques presented, and associated alternatives suggested, must be done on the basis of detailed system analyses of the particular system performance requirements and hardware-cost tradeoffs. All of the techniques presented are viable candidates for optimized systems.

Figure 27:
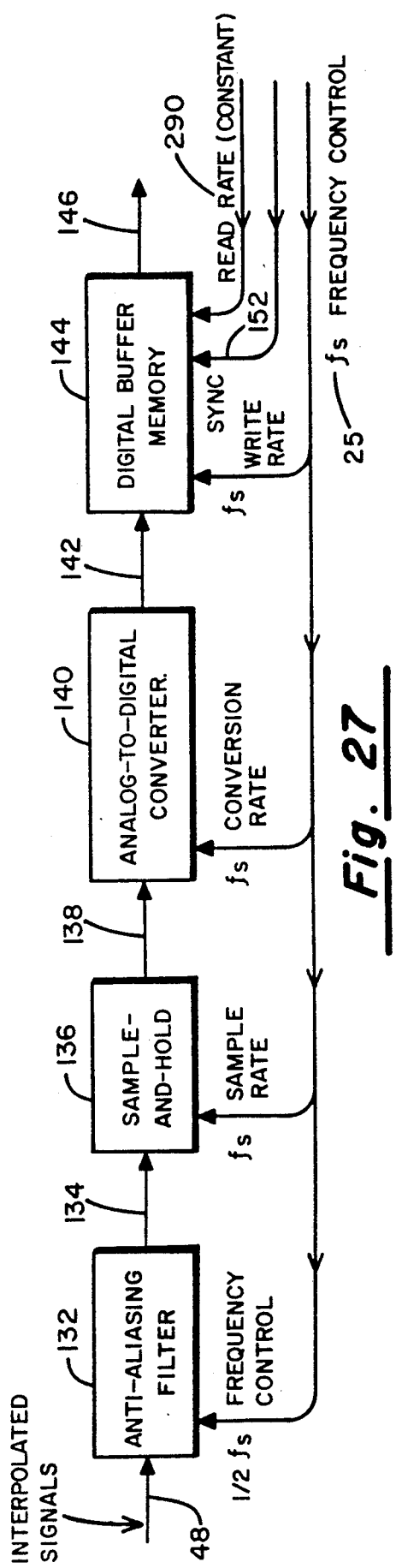
FIG. 27 is a functional block diagram of the ACT signal-processing functions of a specific embodiment of the present invention, which use a digital memory with a variable WRITE rate.
Figure 28:
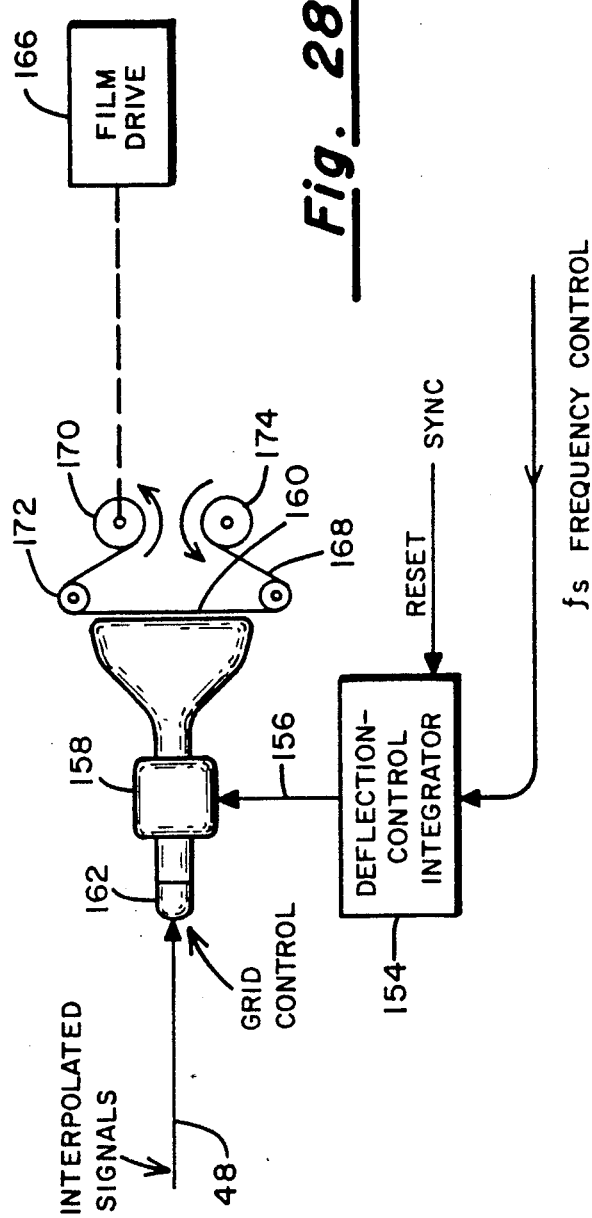
FIG. 28 is a functional block diagram of the ACT signal-processing functions of a specific embodiment of the present invention, which use a cathode-ray-tube film writer with a variable controlled writing rate.

Referring now to FIGS. 27 and 28, the required ACT sampling frequency $f_s$ control 25 is shown for two basic implementations of the recording principles defined by FIGS. 2 and 5, respectively.

In FIG. 27, interpolated signals 48 (FIGS. 8 and 13 through 22) are first low-pass filtered by anti-aliasing filters 132 with a cut-off frequency controlled by $f_s$ to be optimally below the Nyquist limit to just prevent discernible aliasing due to sampling at the $f_s$ rate. The filtered signals on line 134 are sampled and held by sample-and-hold 136 to provide sampled signals on line 138 for analog-to-digital conversion by A/D converter 140. Sample-and-hold 136 and ADC 140 are synchronized by $f_s$. After digital conversion, the digital signals on line 142 are stored in digital buffer memory 144 prior to read-out on line 146 at a constant rate for either immediate display following digital-to-analog conversion or subsequent long-term digital storage or long-term analog storage, following digital-to-analog conversions, prior to display, or both. Buffer memory 144 address control is reset by a sync signal on line 152 from the scan in FIG. 2. Display of the stored imagery is typically provided by a digital scan converter and a cathode-ray tube during replay.

In FIG. 28, interpolated signals 48 drive grid controls of CRT array 162 (as in FIG. 5) and frequency control $f_s$ is integrated by integrator 154 reset by synchronizing line 152 to provide positional deflection-current control on line 156 to deflection coil 158 for position control of the electron image 160 (as in FIG. 5) of the N-beam multi-element array 162 produced by electron lens 164 as used in prior art, and shown schematically in FIG. 5. Alternatively, a conventional linear sweep control reset by line 152 is used to drive coil 158 with the elements of CRT array 162 driven by line 146 of digital buffer memory 144. Unlike prior art, the film velocity, controlled by drive 166 can be constant due to electronic zoom, rather than servo-controlled by $V_{A/C}/H$. These and other advantages will be apparent to those skilled in the art. As in prior art, a film 168 is transported over the CRT phosphor image 160 by take-up reel 170 driven by drive 166, over idler rollers 172 from supply reel 174.

It should also be understood various combinations of the techniques and principles taught by the present patent may be utilized without departing from the spirit and scope of the invention. For example, it will be obvious to those skilled in the art that the analog-to-digital conversions can be performed directly on the detector-element signals such that the synthesis and interpolation functions may be provided with well-known digital processing technology. Also, as in prior art for practical considerations of fabrication, real and/or virtual detector elements and/or recording elements may be staggered or otherwise displaced in the equivalent ACT direction without departing from the scope of the present invention.

In summary, it will be evident to those skilled in the art that the teachings of the present invention have general application to electronic imaging systems which require dynamic computer control of the imaging transfer from one image plane to another at video rates, with optimum efficiencies in the information-theory sense for minimum hardware to satisfy a given requirement for total system channel capacity.

These efficiencies are based on the use of transducer arrays that circumvent the limitations of practical scan speeds and the usual limitations of transducer response times and sensitivities with serial scan. These array efficiencies are then optimized, first by the use of non-linear arrays to minimize the required number of transducer-array elements, then by an immediate reduction to the minimum required number of ALT signal channels and last by continuously maintaining minimum sampling rates to minimize ACT scan-conversion buffer-memory size and subsequent data-handling requirements.

In the present embodiment, the input-array transducer elements are IR detectors in a non-linear array format, and outputs are in a linear array format: either the linear CRT array writing on film, or the linear CRT raster of a TV monitor displaying standard video signals, either from a TV camera viewing the film or from a video formatter replaying data from the N-channel recorder. In summary, the input array is non-linear and the output array is linear. Further, the input-array transducers convert IR to electronic signals and the output array converts electronic signals to a visible image, i.e., the system in the present embodiment is a detection system and one that converts IR to visible wavelengths.

It will be evident to those skilled in the art that the input array transducers could be sensitive to other wavelengths, e.g., visible, UV, X-rays, radar or to other types of emission or radiation such as gamma particles, magnetic fields or sound waves as in SONAR. These teachings are applicable to any scanning system employing transducer arrays.

Furthermore, these teachings are not limited to sensor systems, as in the present embodiment which converts IR to visible. The well-known principles of reciprocity in conventional optimal imaging systems (reversion theorem), in which source and image can be interchanged, are applicable to electronic imaging systems, with such obvious accommodations as reversing buffer amplifier inputs and outputs. Thus, the nonlinear IR input array can be replaced by a nonlinear laser-diode output array to create a very wide-angle laser-scanner display system with a rectilinear format on a flat projection screen, using the same control relations. As noted above, the array transducers (emitters) also could be active at other wavelengths, e.g., X-ray, radar, etc., or could produce other forms of emission or radiation.

Thus these teachings are equally applicable to active scanning systems, such as projectors, transmitters, etc., which require dynamic computer control of the imaging transfer from one image plane (image data source) to another image plane (projection surface, target area, etc.)

Further, the computer control laws can be programmed to suit the particular requirements of any detector/emitter array-scanner system application so as to correct the combined geometrical distortions due to the scanning geometry and the geometry of the object (source) plane/image (target) plane, respectively, in real time at video rates. This capability for dynamic, electronic imaging control offers the possibility of new, more efficient scanning system designs, which heretofore have been limited by the conflicting requirements of collection efficient (speed) and imaging efficiency (resolution). A new degree of freedom in design is provided by the ability to correct geometrical distortions electronically, which could prove to be very cost-effective in concert with meeting other system requirements.

Finally, it will be evident that the teachings of array-element multiplexing techniques for one-dimensional arrays are directly applicable to two- and three-dimensional arrays for two-and three-dimensional spatial control of imaging for geometrical-distortion corrections and for passive and active IR, X-ray, radar and sonar; and are applicable to N-dimensional arrays for multi-spectral sensing, multi-color projection systems and multi-sensor imagery integration.

Other implementations and applications of the present invention which will be apparent to those skilled in the art are to be considered within the scope of the present invention, so I do not wish to be limited to the specific disclosures used in connection with the preferred embodiments.

Having described the invention, what is claimed as new and novel, and only by which I intend to be limited, and for which it is desired to secure Letters Patent, is:

1. An electro-optical system for electromagnetic signal detection comprising, in combination:
   (a) non-linear detector-array means having non-uniformly spaced electro-optical detector elements which produce electrical-signal outputs corresponding to an image being scanned;
   (b) detector-signal multiplexer means for selecting and processing said electrical-signal outputs of said detector elements to produce a plurality of sets of electrical-signal outputs, said sets of electrical-signal outputs being substantially equivalent to the electrical-signal outputs which would be produced by corresponding sets of different-sized virtual-detector linear arrays; and
   (c) signal-output means for receiving said sets of electrical-signal outputs of said detector-signal multiplexer means to provide electro-optical system outputs.

2. The electro-optical system as in claim 1 wherein the sizes of said detector elements are substantially equal to their interelement spacing.

3. The electro-optical system as in claim 1 wherein the sizes of said detector elements are substantially constant.

4. The electro-optical system as in claim 1 wherein said nonlinear detector-array means, said detector-signal multiplexer means and said signal-output means are N-dimensional, where N is a positive integer number.

5. The electro-optical system as in claim 1 wherein said detector-signal multiplexer means comprises, in combination:
   (a) an analog input electronic-signal multiplexer means having a plurality of input terminals connected to said detector elements of said non-linear detector array means to receive said detector-element electrical-signal outputs as said multiplexer means inputs;
   (b) an analog output electronic-signal multiplexer means, having common input terminal coupled to the common output terminal of said analog input electronic-signal multiplexer means, and having output terminals providing said plurality of sets of electrical-signal outputs of said detector-signal multiplexer means; and (c) synchronous control means for sequentially advancing the output terminal selection of said analog output electronic-signal demultiplexer means in controlled relation to sequentially advancing the input terminal selection of said analog input electronic-signal multiplexer means, and for continuously repeating this cycle between predetermined limits, with one cycle corresponding to one signal-input sample interval.

6. The electro-optical system of claim 5 wherein said analog input electronic-signal multiplexer means comprises a cascade of analog signal multiplexers having a plurality of input terminals connected to said detector elements of said non-linear detector array means and to common output terminals of the preceding analog signal multiplexer in said cascade, and having the common output terminal of the last analog signal multiplexer in said cascade comprising said common output terminal of said analog input electronic-signal multiplexer means.

7. The electro-optical system as in claim 1 and further including means for generating a size-control word, said size-control word being a function of an instantaneous required spatial sampling interval; and means responsive to the size-control word for controlling said detector-signal multiplexer means for selecting and processing said detector-element electrical-signal outputs.

8. The electro-optical system as in claim 7 wherein said size-control word is directly proportional to said instantaneous required spatial sampling interval.

9. The electro-optical system as in claim 7 wherein said size-control word is proportional to the logarithm of said instantaneous required spatial sampling interval.

10. The electro-optical system as in claim 1 wherein said non-linear detector-array means consists of a plurality of groups of one or more detector elements with interelement spacings of said groups generally increasing continuously in a predetermined manner over a portion of the array.

11. The electro-optical system as in claim 10 wherein said predetermined manner of continuously increasing detector interelement spacings of said groups is substantially linear over a portion of the array.

12. The electro-optical system as in claim 10 wherein said predetermined manner of continuously increasing detector interelement spacings of said groups is substantially proportional to distance over a portion of the array with said groups positioned exponentially with an exponential base two.

13. The electro-optical system as in claim 10 wherein one or more of said groups of detector elements have constant interelement spacings within a given group.

14. The electro-optical system as in any of claims 1, 2, 3, 10, 11, 12, or 13 wherein said plurality of groups of detector elements are arranged in a biaxially symmetrical manner.

15. The electro-optical system as in any of claims 1, 2, 3, 10, 11, 12, or 13 wherein said detector elements are positioned substantially colinearly.

16. The electro-optical system as in any of claims 1, 2, 3, 10, 11, 12, or 13 wherein said plurality of groups of detector elements are arranged in a biaxially symmetrical manner and said detector elements are positioned substantially colinearly longitudinally.

17. The electro-optical system as in claim 1 and further including means for generating a size-control word: "m.c" having an integer mantissa: "m." and a fractional characteristic: ".c", said size control word being the logarithm to the base 2 of the ALT scale $S_{alt}/S_{min}$ the ratio of the instantaneous ALT spatial sampling interval to the minimum sampling interval; and means responsive to the size-control word integer mantissa part: "m." for controlling the selection performed by said detector-signal multiplexer means, and means responsive to the size-control word fractional characteristic part: ".c" for controlling the interpolation performed by said detector-signal multiplexer means.

18. The electro-optical system as in claim 17 wherein said ALT spatial sampling interval is controlled to be proportional to $(V_{A/C}/H) \cdot COS(A)$ of said system.

19. The electro-optical system as in claim 17 wherein said ALT spatial sampling interval is controlled to be proportional to $V_{A/C}/R$, where $V_{A/C}$ is the instantaneous ALT aircraft velocity over the ground and R is the instantaneous range to the ground imagery being scanned by said system.

20. The electro-optical system as in claim 19 and further including digital map means, wherein said instantaneous range "R" is computed using scan angle from nadir "A", using terrain elevation data stored in said digital map means electronic-data memory addressed by A/C INS position data and using instantaneous A/C altitude AGL.

21. The electro-optical system as in claim 1 wherein said detector-signal multiplexer means comprises, in combination:

(a) a size-synthesizer means coupled to receive said electrical-signal outputs from each of said detector elements with said size-synthesizer means combining said detector-element electrical-signal outputs to synthesize a plurality of sets of electrical-signal outputs corresponding to different-sized synthesized virtual-detector arrays;

(b) a size-selector means coupled to receive said sets of electrical-signal outputs for electronically selecting one set of said plurality of sets of electrical-signal outputs;

(c) an interpolation means coupled to receive said selected one set of said plurality of sets of electrical-signal outputs for electronically interpolating said electrical-signal outputs of the selected set to produce a set of interpolated electrical-signal outputs corresponding to a fractional size of said synthesized virtual-detector arrays.

22. The electro-optical system as in claim 21 wherein said size-synthesizer means includes a plurality of analog-signal weighted summing means.

23. The electro-optical system as in claim 21 wherein said size synthesizer means includes a binary-tree summing means.

24. The electro-optical system as in claim 21 wherein said size-selector means comprises a plurality of analog-signal-selection multiplexer means for performing analog signal selection.

25. The electro-optical system as in claim 21 wherein said interpolation means comprises, in combination:

(a) an analog-signal weighted summing means coupled to receive as inputs the outputs of said size-selector means, said analog-signal weighted summing means with outputs coupled to a plurality of analog-signal interpolation multiplexer means; and (b) the outputs of said plurality of analog-signal interpolation multiplexer means being said set of interpolated electrical-signal outputs of said interpolation means.

26. The electro-optical system as in claim 21 wherein said interpolation mean comprises, in combination:
(a) an analog input electronic-signal multiplexer means having a plurality of input terminals connected to said size-selector means to receive said sets of electrical-signal outputs as said multiplexer means inputs and a common output terminal;
(b) an analog output electronic-signal demultiplexer means, with a common input terminal coupled to said common output terminal of said analog input electronic-signal multiplexer means, and with output terminals providing output signals from said interpolation means; and
(c) synchronous control means for sequentially advancing the output terminal selection of said analog output electronic-signal demultiplexer means in controlled relation to sequentially advancing the input terminal selection of said analog input electronic-signal multiplexer means, and for continuously repeating this cycle between predetermined limits, with one cycle corresponding to one signal-input sample interval.

27. The electro-optical system as in claim 26, 5 or 6 and further including low-pass output filter means coupled to said output terminals of said analog output electronic-signal demultiplexer means, with output signals of said low-pass filter means comprising said detector-signal multiplexer means output signals.

28. The electro-optical system as in claim 27 wherein said low-pass output filter means comprises synchronous integration means consisting of a plurality of one or more serial multiplexer chain consisting of said analog input electronic-signal multiplexer means and said analog output electronic signal demultiplexer means, and further consisting of capacitors connected between said output terminals of said analog output electronic-signal demultiplexer means and electronic-signal grounds.

29. The electro-optical system as in claims 26, 5 or 6 wherein said synchronous control means comprises analog signal multiplexer decoder means for controlling said analog input electronic-signal multiplexer means and said analog output electronic-signal demultiplexer means, and further comprises a binary-number generating means for generation of a pair of binary numbers, said binary numbers controlled to change at rates having a controlled ratio, said binary numbers further controlled by being synchronously reset to a predetermined common value when the binary number having the higher rate of change reaches a predetermined value, with the time interval required to reach said predetermined value after reset corresponding to one signal input sample interval, and having said analog signal multiplexer decoder means controlled by said pair of binary numbers.

30. The electro-optical system as in claim 29 wherein said controlled ratio is proportional to $2^{(.c-1)}$, where .c is the fractional part of the logarithm, base two, of the ALT scale: $S_{alt}/S_{min}$.

31. The electro-optical system as in claim 29 wherein said controlled ratio is proportional to the ALT scale: $S_{alt}/S_{min}$.

32. The electro-optical system as in claim 29 wherein said controlled ratio of said rates of change of one of said pair of binary numbers is substantially proportional to said one of said pair of binary numbers, over the portion of the range of said binary number corresponding to the portion of said non-linear detector-array means having generally increasing interelement spacings, said pair of binary numbers consequentially having an exponential temporal relation.

33. The electro-optical system as in claim 32 wherein said controlled ratio of rates of change of said one of said pair of binary numbers is further proportional to $2^{(.c-1)}$.

34. The electro-optical system as in claim 32 wherein said controlled ratio of rates of change of said one of said pair of binary numbers is further proportional to ALT scale: $S_{alt}/S_{min}$.

35. The electro-optical system as in claim 32 wherein said synchronous control means, providing said controlled ratio, comprises, in combination:
(a) a dual-section binary-counter means, with each of said sections having an input clock terminal, said terminal of the first of said sections coupled to a frequency source means; and
(b) a clock-multiplexer means with decoder means controlled by the binary number of the second of said sections, said clock-multiplexer means having input terminals coupled to successive binary stages of the first of said sections and having the common output terminal coupled to said input clock terminal of the second of said sections.

36. The electro-optical system as in claim 1 wherein said detector-signal multiplexer means comprises in combination:
(a) a plurality of analog input electronic-signal multiplexer means having a plurality of input terminals connected to said detector elements of said non-linear detector array means to receive said detector-element electrical-signal outputs as said multiplexer means inputs, and having common output terminals of said plurality of analog input electronic-signal multiplexer means providing said plurality of sets of electrical-signal outputs of said detector-signal multiplexer means; and
(b) control means for independently, sequentially advancing the input terminal selection of each of said plurality of analog input electronic-signal means.

37. The electro-optical system as in claim 36 wherein said control means comprises analog signal multiplexer decoder means for controlling input terminal selections of said plurality of analog input electronic-signal multiplexer means, and further comprising scaling sequential-selection means for controlling said analog signal multiplexer decoder means.

38. The electro-optical system as in claim 37 wherein said scaling sequential-selection means sequentially advances input terminal selections of said plurality of analog input electronic-signal multiplexer means between predetermined limits determined by ALT scale, with a continuous repetitive cycling between said predetermined limits and with the time interval of one cycle corresponding to one averaged signal input sample interval.

39. The electro-optical system as in claim 38 wherein said scaling sequential-selection means consists of a digital preset counter means having its count advanced by being clocked by a frequency source means, and further consisting of a digital comparator means for comparing said count with a first predetermined limit, having preset means for presetting said preset counter to a second predetermined limit when the said count exceeds said first predetermined limit and having said count of said preset counter means properly scaled by a ROM in relation to the topology of said detector elements of said non-linear detector-array means, for control of said analog signal multiplexer decoder means.

40. The electro-optical system as in claim 38 wherein said predetermined limits are linearly related to ALT scale and are further proportional to the index of the said analog input electronic-signal multiplexer means common output terminals, said index being integer numbers predetermined by the mapping topology of said detector-signal multiplexer means.

41. The electro-optical system as in claim 40, wherein said predetermined limits are linearly related to ALT scale and are further proportional to said index with offsets related to said index over a first portion of said non-linear array means corresponding to a non-linear portion of said non-linear array, and with constant offsets over a second portion of said non-linear array means corresponding to a linear portion of said non-linear array.

42. The electro-optical system as in any one of claims 5, 6, 26, 36, 37, 38, 39, 40, or 41 wherein said analog input electronic-signal multiplexer means is controlled by said control means to sequentially sample said non-uniformly spaced detector elements of said non-linear detector-array means with a substantially constant scanning velocity over said non-linear detector array means, during a given said signal-input sample interval.

43. The electro-optical system as in claim 1 wherein said detector-signal multiplexer means further includes electrical-signal data storage means.

44. The electro-optical system as in claim 43 wherein said storage means comprises a cathode-ray tube means having nonuniform scan rates with the persistence of the phosphor of said cathode-ray tube means providing said electrical-signal data storage means.

45. The electro-optical system as in claim 44 wherein said non-uniform scan rates are proportional to the ACT sampling frequency.

46. The electro-optical system as in claim 44 and further including data recording means cooperating with said cathode-ray tube means for recording the image stored on the phosphor.

47. The electro-optical system as in claim 46 wherein said recording means is a photographic film recorder.

48. The electro-optical system as in claim 46 wherein said data recording means comprises in combination a transducer means and a magnetic tape recording means.

49. The electro-optical system as in claim 43 wherein said storage means comprises: a digital-data storage buffer memory means having a write data bus and an address bus; analog-to-digital converter means coupled to receive as input said sets of electrical-signal outputs of claim 1 and to provide digital output signals corresponding thereto to said write data bus at a nonuniform rate proportional to the ACT sampling frequency.

50. The electro-optical system as in claims 45 or 49 wherein said ACT sampling frequency is controlled to be proportional to R, where R is the instantaneous range to the ground imagery being scanned by said system.

51. The electro-optical system as in claim 50 wherein said instantaneous range is compared as H/COS(A) of said system, said system being mounted in an aircraft where H is the instantaneous altitude AGL of said aircraft and A is the instantaneous scan angle from nadir of said system.

52. The electro-optical system as in claim 50 wherein said instantaneous range R is computed from scan angle from nadir, from terrain elevation data stored in a digital map electronic data memory addressed by A/C INS position data, and from the instantaneous A/C altitude AGL at nadir.

53. The electro-optical system as in claim 49, wherein said analog-to-digital converter means is coupled to receive as inputs said detector-element electrical-signal outputs directly; further said digital-data storage buffer memory means having a read data bus and an address bus coupled to a digital processing means, said digital processing means comprising said detector-signal multiplexer means.

54. The electro-optical system as in claims 49 or 53, further comprising anti-aliasing filter means having low-pass-filter cutoff frequency controlled to be proportional to said ACT sampling frequency; said anti-aliasing filter means coupled to receive as inputs said inputs of said analog-to-digital converter means and to provide filtered output signals to said analog-to-digital converter inputs, said filtered output signals having substantially no aliasing signal content over the range of said ACT sampling frequency.

55. The electro-optical system as in claim 53, wherein said write data bus of claim 48 is provided with said digital output signals at a constant rate, said digital output signals being averaged by said digital processing means to provide averaged signals substantially equivalent to said digital output signals corresponding thereto to said write data bus at said non-uniform rate proportional to said ACT sampling frequency.

56. The electro-optical system as in claim 53, said digital processing means comprising said detector-signal multiplexer means of claim 11.

57. The electro-optical system as in claim 56, wherein said size-synthesizer means of said digital processing means includes a plurality of digital-signal weighted summing means.

58. The electro-optical system as in claim 56, wherein said size-synthesizer means of said digital processing means includes a binary-tree summing means.

59. The electro-optical system as in claim 56, wherein said size-selector means of said digital processing means comprises a plurality of digital-signal-selection multiplexer means for performing digital signal selection.

60. The electro-optical system as in claim 56, wherein said interpolation means of said digital processing means comprises, in combination:
  (a) a digital-signal weighted-summing means coupled to receive as inputs the outputs of said size-selector means;
  (b) said digital-signal weighted-summing means having outputs coupled to a plurality of digital-signal interpolation multiplexer means; and
  (c) the outputs of said plurality of digital-signal interpolation multiplexer means being said set of interpolated electrical-signal outputs of said interpolation means.

61. An imaging system for image-signal detection comprising, in combination:
  (a) nonlinear transducer-array means having nonuniformly spaced transducer elements which produce electrical-signal outputs corresponding to an image being scanned;
  (b) transducer-signal multiplexer means for selecting and processing said electrical signal outputs of said transducer elements to produce a plurality of sets of electrical-signal outputs being substantially equivalent to the electrical-signal outputs which would be produced by corresponding sets of different-sized virtual-transducer linear arrays; and (c) signal-output means for receiving said sets of electrical-signal outputs of said transducer-signal multiplexer means to provide imaging system outputs.

62. The imaging system as in claim 61 and further including means for generating a size-control word, said size-control word being a function of an instantaneous required sampling interval; and means responsive to the size-control word for controlling said transducer-signal multiplexer means for selecting and processing said transducer element electrical-signal outputs.

63. The imaging system as in claim 61 wherein said nonlinear transducer-array means, said transducer-signal multiplexer means and said signal-output means are N-dimensional, where N is a positive integer number.

64. A projection system for image-signal emission comprising, in combination:

(a) signal-input means for generating electrical-signal outputs substantially equivalent to electrical-signal inputs to corresponding sets of different-sized virtual-transducer linear arrays which would produce the image being projected;

(b) transducer-signal multiplexer means for processing said electrical-signal outputs of said signal-input means to produce a plurality of electrical-signal outputs; and (c) nonlinear transducer-array means having nonuniformly spaced transducer elements, the emission of said transducer elements being controlled by said plurality of electrical-signal outputs of said transducer-signal multiplexer means, said emission of said transducer elements producing said image, said image being projected by scanning said nonlinear transducer-array means.

65. The projection system as in claim 64 and further including means for generating a size-control word, said size-control word being a function of an instantaneous required sampling interval; and means responsive to the size-control word for controlling said transducer-signal multiplexer means to produce said plurality of electrical-signal outputs for controlling said transducer elements of said nonlinear transducer-array means.

66. The projection system as in claim 64 wherein said signal-input means, said transducer-signal multiplexer means and said nonlinear transducer array means are N-dimensional, where N is a positive integer number.

* * * * *

UNITED STATES PATENT AND TRADEMARK OFFICE
CERTIFICATE OF CORRECTION

PATENT NO. : 5,028,998
DATED      : July 2, 1991
INVENTOR(S) : William E. Westell It is certified that error appears in the above-identified patent and that said Letters Patent is hereby corrected as shown below:

Column 22, Line 65 (CLaim 5), delete the word "multiplexer" and replace it with -- demultiplexer --.

Column 28, Line 26 (Claim 55), delete the number "48" and replace it with -- 49 --.

Column 28, Line 35 (Claim 56), delete the number "11" and replace it with -- 21 --.

Signed and Sealed this

Sixth Day of October, 1992

Attest:

DOUGLAS B. COMER

*Attesting Officer*          Acting Commissioner of Patents and Trademarks